United States Patent [19]

Bryan et al.

[11] Patent Number: 5,095,218
[45] Date of Patent: Mar. 10, 1992

[54] X-RAY INTENSIFYING SCREEN WITH ENHANCED EMISSION

[75] Inventors: Philip S. Bryan, Rochester; Patrick M. Lambert, Webster; Christine M. Towers, Rochester; Gregory S. Jarrold, Henrietta, all of N.Y.

[73] Assignee: Eastman Kodak Company, Rochester, N.Y.

[21] Appl. No.: 556,587

[22] Filed: Jul. 20, 1990

[51] Int. Cl.$^5$ .............................................. C09K 11/67
[52] U.S. Cl. ......................... 250/483.1; 252/301.4 F; 428/690
[58] Field of Search .............. 252/301.4 F; 250/483.1; 428/690

[56] References Cited

U.S. PATENT DOCUMENTS

| | | | |
|---|---|---|---|
| 2,542,336 | 2/1951 | Kröger et al. | 252/301.4 |
| 4,006,097 | 2/1975 | Kelsey | 252/301.4 F |
| 4,967,085 | 10/1990 | Bryan et al. | 252/301.4 F |
| 4,988,881 | 1/1991 | Bryan et al. | 252/301.4 F |
| 4,990,282 | 2/1991 | Bryan et al. | 252/301.4 F |
| 4,992,205 | 2/1991 | Bryan et al. | 252/301.4 F |
| 4,994,205 | 2/1991 | Bryan et al. | 252/301.4 F |
| 4,996,003 | 2/1991 | Bryan et al. | 252/301.4 F |

OTHER PUBLICATIONS

L. H. Brixner, "Structural and Luminescent Properties of the $Ln_2Hf_2O_7$-type Rare Earth Hafnates", Mat. Res. Bull., vol. 19, pp. 143-149, 1984.

E. Iwase and S. Nishiyama, "Luminescence Spectra of Trivalent Rare Earth Ions", Proc. Intern. Sym. Mol. Struct. Spectry., Tokyo, 1962, A-407-1 to 7.

Bryan et al., U.S. Ser. No. 305,222, filed Feb. 3, 1989, titled X-Ray Intensifying Screen, Phosphor Composition, and Process of Phosphor Preparation, commonly assigned.

Bryan et al., U.S. Ser. No. 393,602, filed Aug. 14, 1989, titled Phosphor Composition and X-Ray Intensifying Screen, commonly assigned, a continuation-in-part of U.S. Ser. No. 305,310, filed Feb. 3, 1989, now abandoned.

Primary Examiner—Jack Cooper
Attorney, Agent, or Firm—Carl O. Thomas

[57] ABSTRACT

An intensifying screen for producing a latent image in a silver halide radiographic element upon exposure to an image pattern of X-radiation is disclosed. The intensifying screen contains a fluorescent layer containing a phosphor capable of absorbing X-radiation and emitting longer wavelength electromagnetic radiation comprised of monoclinic crystals of a titanium activated zirconium hafnium oxide phosphor host. The phosphor contains in an amount sufficient to enhance emission of the longer wavelength electromagnetic radiation at least one alkali metal in combination with at least one Group 14 dopant chosen from Periods 3, 4 and 5.

30 Claims, No Drawings

X-RAY INTENSIFYING SCREEN WITH ENHANCED EMISSION

FIELD OF THE INVENTION

The invention relates to novel X-ray intensifying screens. More specifically, the invention relates to fluorescent screens of the type used to absorb an image pattern of X-radiation and to emit a corresponding pattern of longer wavelength electromagnetic radiation.

BACKGROUND OF THE INVENTION

A developable latent image is formed in a silver halide emulsion layer of a radiographic element when it is imagewise exposed to X-radiation. Silver halide emulsions, however, more efficiently absorb and consequently are more responsive to longer (300 to 1500 nm) wavelength electromagnetic radiation than to X-radiation. Silver halide possesses native sensitivity to both the near ultraviolet and blue regions of the spectrum and can be sensitized readily to the green, red, and infrared portions of the electromagnetic spectrum.

Consequently it is an accepted practice to employ intensifying screens in combination with silver halide emulsion layers. An intensifying screen contains on a support a fluorescent phosphor layer that absorbs the X-radiation more efficiently than silver halide and emits to the adjacent silver halide emulsion layer longer wavelength electromagnetic radiation in an image pattern corresponding to that of the X-radiation received.

While the phosphor layer and emulsion layer can be integrated into one element, in most instances the adjacent silver halide emulsion layer is coated on a separate support to form a separate radiographic element. In this way, the intensifying screen, which is not permanently altered by exposure, can be reused. The most common arrangement for X-radiation exposure is to employ a dual coated radiographic element (an element with silver halide emulsion layers on opposite sides of a support), each emulsion layer being mounted adjacent a separate intensifying screen.

It has been recognized that the phosphors of highest absorption efficiencies are those in which the host compound contains at least one element from Period 6 of the Periodic Table of Elements. For example, barium sulfate, lanthanide oxyhalides and oxysulfides, yttrium tantalate, and calcium tungstate, are widely employed phosphor host compounds.

One family of phosphor host compounds that have shown promise in terms of performance, but have been little used are rare earth hafnates. L. H. Brixner, "Structural and Luminescent Properties of the Ln$_2$Hf$_2$O$_7$-type Rare Earth Hafnates", Mat. Res. Bull., Vol. 19, pp. 143-149, 1984, describes investigations of such phosphor host compounds. Ln is defined to include not only lanthanides, but also scandium and yttrium. A significant practical disadvantage in formulating these host phosphor compounds is that firing to temperatures in the 1800° to 1900° C. range is required to obtain a single phase composition. These firing temperatures render rare earth hafnates burdensome to prepare as phosphor host compounds.

One hafnium containing phosphor host compound that has been recognized to possess high efficiency in its absorption of X-radiation, but has enjoyed no practical use is optical grade hafnia. Kelsey U.S. Pat. No. 4,006,097, issued May 5, 1975, discloses to be useful in the absorption of X-radiation a phosphor satisfying the formula:

$$HfO_2:Yb$$

with Yb being present in a concentration of $5 \times 10^{-3}$ to $1 \times 10^{-1}$.

Brixner, cited above, after reporting the properties of Ti$^{+4}$ as an activator for rare earth hafnates, stated:

> We also looked at this same activator in pure HfO$_2$. Under 30 kVp Mo radiation x-ray excitation, this composition also emits in a broad band centered around 477 nm as seen in FIG. 5. This emission has an intensity of about 1.6 times that of PAR CaWO$_4$ and could therefore be of interest as an x-ray intensifying screen phosphor, especially in light of the superior absorption of HfO relative to CaWO as seen in FIG. 6. *Unfortunately, the price of optical grade HfO is so prohibitive that it cannot be used in screen applications.* (Emphasis added.)

Optical grade hafnia contains less than $3 \times 10^{-4}$ mole of zirconia per mole of hafnia. It is the difficulty in separating zirconium and hafnium that primarily accounts for the cost of optical grade hafnia.

Zirconium and hafnium are known to be atoms of essentially similar radii, 1.454 Å and 1.442 Å, respectively. Practically all known compounds of zirconium and hafnium correspond to the +4 oxidation state. The chemical properties of the two elements are essentially identical. The elements are found together in nature and can not be entirely separated.

Zirconia and hafnia both exist predominantly in a stable monoclinic crystalline phase at room temperature, with the size of the crystal cell being very similar. As reported by E. Iwase and S. Nishiyama, "Luminescence Spectra of Trivalent Rare Earth Ions", *Proc. Intern. Sym. Mol. Struct. Spectry.*, Tokyo, 1962, A-407-1 to 7, the crystal lattice constants of monoclinic hafnia and zirconia are as follows:

| Oxide | a-axis | b-axis | c-axis | β |
|---|---|---|---|---|
| HfO$_2$ | 5.11 | 5.14 | 5.28 | 99° 44' |
| ZrO$_2$ | 5.21 | 5.26 | 5.375 | 99° 55' |

Iwase and Nishiyama investigated "high purity Hf and Zr compounds" for cathodoluminescence—i.e., fluorescence response to electron bombardment.

Kroger et al U.S. Pat. No. 2,542,336 discloses phosphors containing titanium as an activator and having a matrix comprised of one or more of the oxides of zirconium, hafnium, thorium, germanium or tin. Titanium activated zirconium oxide, magnesium stannate, calcium zirconate and zirconium phosphate are each specifically disclosed. In addition, Kroger et al suggests the formulation of phosphors which contain germanium, zirconium or hafnium and oxygen complexed with other nonmetals, such as sulfur, boron, phosphorus, silicon and the like; however, inclusions of these nonmetals as components of the host phosphor produce distinctly different crystal structures than GeO$_2$, ZrO$_2$ and HfO$_2$ and are not considered relevant to this invention.

Bryan et al (I) U.S. Ser. No. 305,222, filed Feb. 3, 1989, titled X-RAY INTENSIFYING SCREEN, PHOSPHOR COMPOSITION, AND PROCESS OF PHOSPHOR PREPARATION, now U.S. Pat. No. 4,988,880, commonly assigned, discloses that efficient X-ray intensifying screens can be constructed from titanium activated hafnia phosphors containing minor amounts of zirconium, but higher amounts than found in optical grade hafnia, specifically:

$$Hf_{1-z}Zr_z$$

where z ranges from $4 \times 10^{-4}$ to 0.3.

Bryan et al (II) U.S. Ser. No. 393,602, filed Aug. 14, 1989, titled PHOSPHOR COMPOSITION AND X-RAY INTENSIFYING SCREEN, now U.S. Pat. No. 4,988,881 commonly assigned, a continuation-in-part of U.S. Ser. No. 305,310, filed Feb. 3, 1989, now abandoned, discloses the preparation of lithium hafnate phosphors containing higher levels of zirconium than are present in optical grade hafnium sources. In the preparation of the lithium hafnate phosphor hafnia has been also formed as a secondary phase. The crystal structure of lithium hafnate is unlike that of hafnia and therefore not relevant to the present invention.

SUMMARY OF THE INVENTION

The present invention constitutes an improvement on the teachings of Bryan et al (I), cited above, based on the discovery that the properties of the most efficient phosphors therein disclosed, alkali metal containing titanium activated zirconium hafnium oxide, can be further improved by the incorporation of at least one Group 14 dopant selected from Periods 3, 4 and 5. Specifically both germanium and silicon dopants have been shown to increase luminescence while tin can shift the spectral profile of emissions.

In one aspect this invention is directed to an intensifying screen comprised of a support and a fluorescent layer containing a phosphor capable of absorbing X-radiation and emitting longer wavelength electromagnetic radiation comprised of monoclinic crystals of a titanium activated zirconium hafnium oxide phosphor host. The phosphor contains in an amount sufficient to enhance emission of the longer wavelength electromagnetic radiation at least one alkali metal in combination with at least one Group 14 dopant chosen from Periods 3, 4 and 5.

DESCRIPTION OF PREFERRED EMBODIMENTS

In the discussion which follows all references to elements in terms of Group and Period designations are based on the designations assigned by the Periodic Table of Elements as adopted by the American Chemical Society.

The intensifying screens of this invention employ a titanium activated zirconium hafnium oxide host phosphor capable of absorbing X-radiation and emitting longer wavelength electromagnetic radiation, with peak emission typically being in the 450 to 500 nm region of the spectrum. It has been discovered that the inclusion of at least one alkali metal in combination with at least one Group 14 dopant chosen from Periods 3, 4 and 5 enhances the emission of the longer wavelength electromagnetic radiation.

The zirconium content of the host phosphor can range from the lowest obtainable impurity levels of zirconium in hafnia, but preferably does not exceed 30 mole percent, based on zirconium and hafnium combined. The preferred hafnia host phosphors contain higher levels of zirconium than are present in optical grade hafnia. As employed herein the term "optical grade hafnia" refers to hafnia sold as optical grade or prepared from any optical grade hafnium source.

Optical grade hafnia is the purest form of hafnia commercially available and is therefore sometimes referred to in the literature as "pure hafnia" and in the phosphor art, where high levels of purity are the normal practice, simply as hafnia. Optical grade hafnia contains less than $3 \times 10^{-4}$ mole of zirconia per mole of hafnia.

The preferred phosphor host in the intensifying screens of this invention consists essentially of hafnia ($HfO_2$) and zirconia ($ZrO_2$) with the hafnium and zirconium ions in the phosphor host satisfying the relationship $$Hf_{1-z}Zr_z \qquad (I)$$

where z is in the range of from $4 \times 10^{-4}$ to 0.3, most preferably from $1 \times 10^{-3}$ to 0.2, and optimally from $2 \times 10^{-3}$ to 0.1.

Stated another way, the present invention contemplates intensifying screens in which the phosphor host is prepared from reagent grade hafnia, which, referring to relationship I, is commercially available with z being slightly less than $2 \times 10^{-2}$. Surprisingly, this material forms a phosphor having a higher level of luminescence than optical grade hafnia. From the Examples below it is apparent that by blending reagent grade hafnium sources with optical grade hafnium sources so that z is about $1 \times 10^{-2}$ peak phosphor luminescence intensities are realized. The Examples below also demonstrate that by blending optical or reagent grade zirconium compounds with reagent grade hafnium compounds to form zirconium rich hafnia host phosphors, higher luminescence intensities than demonstrated by optical grade hafnia are also realized, until z reaches a level greater than 0.3. The fact that zirconia exhibits a lower luminescence intensity than hafnia when exposed to X-radiation is, of course, to be expected, since zirconium lies in Period 5 of the Periodic Table of Elements. That a limited range of zirconium concentrations in a hafnia host can increase phosphor luminescence has not been realized by others.

The small amounts of other elements found in commercially available reagent grade hafnium and zirconium source compounds are not detrimental to intensifying screen performance. Therefore, other possible impurities of the phosphor host need be given no further consideration. It is also possible to combine hafnium and zirconium from commercial sources in any ratio satisfying relationship I above to produce the monoclinic host phosphor crystal structure desired. The hafnium and zirconium containing mixture is chosen so that upon firing only hafnium, zirconium, selected activators and dopants, and oxygen atoms remain as residue, any other moieties of the compounds being thermally decomposed or otherwise driven off in firing.

Common sources of hafnium and zirconium include the dioxides, the basic carbonates, the oxychlorides, the oxynitrates, the sulfates, and the tetrachlorides. While the dioxides, the basic carbonates, and the sulfates can be used as purchased to produce phosphors, it is advantageous for both handling and phosphor performance to convert the other sources to less soluble solids that can be fired to give the monoclinic $Hf_{1-z}Zr_zO_2$ phosphor host desired. For example, treatment of aqueous hafnium and zirconium ion containing solutions with base (e.g., alkali or ammonium hydroxide) gives a precipitate which is a mixture of hydrous hafnia and hydrous zirconia, the relative proportions of which depend upon those present in the starting materials.

Other useful solids satisfying $Hf_{1-z}Zr_z$ requirements can be produced by treating hafnium and zirconium ion containing solutions with organic precipitating agents, since organic materials consisting of carbon, hydrogen, and optionally nitrogen and/or oxygen leave no objectionable residue upon thermal decomposition.

Hafnium and zirconium can be conveniently coprecipitated as carboxylates, such as those containing from about 2 to 20 carbon atoms. The carboxylate moieties are in one preferred form aliphatic carboxylates containing from about 2 to 10 carbon atoms, including both monocarboxylates and polycarboxylates—particularly dicarboxylates, such as oxalates, succinates, fumarates, etc. Aromatic carboxylates, such as benzoates, phthalates, and their ring substituted homologues, are also convenient to use. A particularly preferred class of carboxylates are α-hydroxycarboxylates containing from 2 to 10 carbon atoms, such as glycolates, lactates, and mandelates. Oxalic acid can be viewed as either a dicarboxylic acid or an α-hydroxycarboxylic acid. Oxalates are particularly preferred moieties for forming not only hafnium and zirconium compounds, but also compounds of other metals to be incorporated in forming preferred forms of the phosphor more particularly described below. The carboxylate moieties can form simple carboxylates with the hafnium or zirconium or can form hafnium or zirconium carboxylate complexes including additional cations, such as alkali metal or ammonium ions.

The hafnium and zirconium carboxylates can be conveniently formed by reacting in a common solvent the acid, salt, or ester of the carboxylate with hafnium and zirconium containing compounds in the ratios desired in the phosphor. The hafnium and zirconium containing compounds to be reacted can be selected from among compounds such as hafnium tetrachloride, zirconium tetrachloride, hafnium oxychloride, zirconium oxychloride, hafnium basic carbonate, zirconium basic carbonate, hafnium nitrate, zirconium nitrate, zirconium carbonate, hafnium sulfate, zirconium sulfate, and mixtures thereof.

It is also contemplated to employ hafnium and zirconium alkoxides as starting materials. Preferred hafnium and zirconium alkoxides are those which satisfy formula II:

$$D(OR)_4 \qquad (II)$$

where
D represents zirconium or hafnium and
R represents a hydrocarbon moiety containing from about 1 to 20 (preferably about 1 to 10) carbon atoms.

The hydrocarbon moieties can be chosen from any convenient straight or branched chain or cyclic saturated or unsaturated aliphatic hydrocarbon moiety—e.g., alkyl, cycloalkyl, alkenyl, or alkynyl. Alternatively the hydrocarbon moiety can be an aromatic moiety—e.g., benzyl, phenyl, tolyl, xylyl, naphthyl, etc. In a specifically preferred from R is in each instance lower alkyl of from 1 to 4 carbon atoms. Hafnium and zirconium alkoxides are disclosed in U.S. Pat. Nos. 3,297,414; 3,754,011; 4,525,468; and 4,670,472, the disclosures of which are here incorporated by reference.

In addition to alkoxide and carboxylate moiety containing hafnium and zirconium compounds various chelates, such as hafnium and zirconium β-diketones and diaminecarboxylates can be employed. Exemplary useful hafnium starting materials are set forth under heading III below. All the compounds have otherwise identical zirconium analogues. Further, although water of hydration has been omitted, it is to be understood that under normal ambient conditions most of the compounds exist as hydrates.

| (III) Exemplary Hafnium Starting Materials | | |
|---|---|---|
| H-1 | Hafnyl oxalate | $HfO(C_2O_4)$ |
| H-2 | Hafnyl oxalic acid | $H_2[HfO(C_2O_4)_2]$ |
| H-3 | Dioxalatohafnium | $Hf(C_2O_4)_2$ |
| H-4 | Trioxalatohafnic acid | $H_2[Hf(C_2O_4)_3]$ |
| H-5 | Ammonium trioxalatohafnate | $(NH_4)_2[Hf(C_2O_4)_3]$ |
| H-6 | Potassium tetraoxalatohafnate | $K_4[Hf(C_2O_4)_4]$ |
| H-7 | Sodium tetraoxalatohafnate | $Na_4[Hf(C_2O_4)_4]$ |
| H-8 | Ammonium hafnyl oxalate | $(NH_4)_2[HfO(C_2O_4)_2]$ |
| H-9 | Polyoxalatopolyhafnic acids | |
| H-10 | Potassium hafnyl tartrate | $K_2[HfO(C_4H_4O_6)_2]$ |
| H-11 | Tetramandelatohafnic acid | $H_4[Hf(O_2CCHOC_6H_5)_4]$ |
| H-12 | Triglycolatohafnic acid | $H_3HfOH(OCH_2COO)_3$ |
| H-13 | Trilactohafnic acid | $H_3HfOH(OCHCH_3COO)_3$ |
| H-14 | Trioxodihafnium stearate | $Hf_2O_3(O_2C(CH_2)_{16}CH_3)_2$ |
| H-15 | Trioxodihafnium 2-ethylcaproate | $Hf_2O_3(O_2CCHC_2H_5(CH_2)_3CH_3)_2$ |
| H-16 | Hafnium acetylacetonate | $Hf(C_5H_7O_2)_4$ |
| H-17 | Potassium bisnitrilotriacetohafnate | $K_2\{Hf[N(CH_2CO_2)_3]\}$ |
| H-18 | Hafnium ethylenediaminetetraacetic acid | $Hf[(O_2CCH_2)_2NCH_2]_2$ |
| H-19 | Hafnyl malonate | $HfO(O_2CCH_2CO_2)$ |
| H-20 | Hafnyl phthalate | $HfO(O_2C_6H_4CO_2)$ |
| H-21 | Hafnium tetraisopropoxide | $Hf(OC_3H_7)_4$ |
| H-22 | Hafnium tetra-t-amyloxide  | $Hf(OC_5H_{11})_4$ |
| H-23 | Hafnium tetra(phenoxide) | $Hf(OC_6H_5)_4$ |
| H-24 | Hafnium di(isopropoxide) bis(2-ethoxyethoxide) | $Hf(OC_3H_7)_2(OC_2H_4OC_2H_5)_2$ |
| H-25 | Hafnium tetra(cyclohexoxide) | $Hf(OC_6H_{11})_4$ |
| H-26 | Hafnium di(isopropoxide) bis[2-(2-n-dodecanoxyethoxy)ethoxide] | $Hf(OC_3H_7)_2(OC_2H_4OC_2H_4OC_{12}H_{25})_2$ |

Formation of the zirconium rich monoclinic hafnia phosphor host is achieved by heating the zirconium and hafnium compounds to temperatures up to and including 1400° C. Higher firing temperatures can, of course, be undertaken, since the phosphor possesses high thermal stability. However, it is a distinct advantage of this invention that firing temperatures above 1400° C. are not required. Preferred firing temperatures are in the range of from about 900° to 1300° C.

Firing is continued until conversion to the monoclinic phase is achieved. For maximum firing temperatures the duration of firing can be less than 1 hour. While extended firing times are possible, once the phosphor has been converted to the monoclinic crystalline form, extending the duration of firing serves no useful purpose. Generally firing times in the range of from 1 to 10 hours, more typically 2 to 5 hours, provide full conversions of the starting materials to the phosphor composition sought.

Since the starting materials are in most instances decomposed at temperatures well below the 900° C. minimum temperature level contemplated for crystallization of the monoclinic phase, it is generally convenient to heat the starting materials to a temperature above their decomposition temperature, but below 900° C., for an initial period to purge volatilizable materials before progressing to the higher crystallization temperatures. Typically, a preliminary heating step in the range of from about 300° to 900° C., preferably in the range of from 400° to 700° C., is undertaken.

It is also often convenient to divide firing into two or more consecutive steps with intermediate cooling to permit grinding and/or washing the material. Intermediate grinding can facilitate uniformity while intermediate washing, typically with distilled water, reduces the risk of unwanted contaminants, such as starting material decomposition by-products.

It has been discovered that firing the hafnia phosphor in the presence of a flux of one or a combination of alkali metal ions incorporates alkali metal ion in the phosphor and dramatically increases its luminescence intensity. The phosphors employed in the practice of the present invention are those that satisfy the relationship:

$$Hf_{1-z}Zr_zM_y \qquad (IV)$$

where
M represents at least one alkali metal;
y is in the range of from $1 \times 10^{-4}$ (preferably $6 \times 10^{-4}$) to 1 (preferably 0.3; optimally 0.05); and
z is as defined above.

Investigations have revealed that the benefits of alkali metal ion inclusion are fully realized at relatively low concentrations and incorporation of alkali metal ions in concentrations above those required for maximum luminescence enhancement are not detrimental to luminescence. There is no phosphor performance basis for limiting y to values of 1 or less. Rather it is primarily a phosphor preparation convenience.

Alkali metal ion inclusion in the phosphor can be conveniently accomplished by forming a mixture of the hafnium and zirconium starting materials discussed above and a compound capable of releasing alkali metal ions on heating. The amount of the alkali metal compound employed is chosen to supply alkali metal ion in a concentration in excess of that sought to be incorporated in the phosphor. Thus, the following is contemplated as a starting material relationship:

$$Hf_{1-z}Zr_zM_m \qquad (V)$$

wherein
M represents at least one alkali metal;
m is greater than $3 \times 10^{-2}$ (preferably from $1 \times 10^{-1}$ to 6); and
z satisfies any of the values noted in connection with relationships I and IV.

The alkali metal compounds can be alkali metal analogues of the hafnium and zirconium starting materials discussed above. Preferred alkali metal compound starting materials include alkali metal carbonates, sulfates, oxalates, halides, hydroxides, borates, tungstates, and molybdates. Mixtures of alkali metal starting materials are contemplated, particularly when different alkali metals are being concurrently incorporated in the phosphor. Since in one form the hafnium and zirconium complexes of formula III can contain alkali metal ion, the alkali metal can wholly or in part be provided by these complexes. A convenient preparation approach is to employ alkali metal containing hafnium and zirconium complexes satisfying formula III and to increase the alkali metal content of the starting materials by adding other alkali metal compounds, as indicated above.

In relationship V, m can range of up to 10 or more. Most of the excess of alkali metal is removed during phosphor preparation. When an excess of alkali metal is incorporated in the phosphor, it is preferred to divide firing into two or more sequential steps with intermediate grinding and washing to remove soluble alkali metal compounds. This reduces the level of alkali metal compounds available for release during heating in a corrosive volatilized form and also reduces the possibility of forming less desirable secondary phases.

Investigation of the alkali metal containing phosphors indicates that they exhibit increased levels of luminescence even after extended washing has reduced the alkali metal content to very low levels, approaching detection limits. While it is believed that the alkali metal is incorporated into the monoclinic crystals of the phosphor, this has not been conclusively established. It is possible that the alkali metal content of the phosphor is at least partially a surface remnant of the alkali metal flux on the surface of the monoclinic crystals during their formation during firing.

High levels of phosphor luminescence have been obtained by employing lithium as an alkali metal. In a preferred form lithium containing phosphors according to this invention satisfy the relationship:

$$Hf_{1-z}Zr_zLi_y \qquad (VI)$$

wherein
y is in the range of from $8 \times 10^{-4}$ to 0.3 and
z is selected from any one of the ranges indicated above.

Lithium containing phosphors according to this invention are preferably prepared by selecting starting materials so that the hafnium, zirconium, and lithium ions present prior to heating satisfy the following relationship:

$$Hf_{1-z}Zr_zLi_l \qquad (VII)$$

wherein
l is in the range of from $4 \times 10^{-2}$ to 2.0 (optimally from $7 \times 10^{-2}$ to 1.5) and
z is selected as described above.

When lithium is selected as the alkali metal, it has been observed that, in addition to forming the zirconium rich hafnia phosphor with lithium included, a second phase of lithium hafnate can be formed, depending upon the proportion and selection of lithium compound starting materials. Since lithium hafnate lacks the luminescence intensities of titanium and lithium containing hafnia, a preferred embodiment of the invention, lithium starting materials and their concentrations are selected so that any overall luminescence of the two phases remains higher than that attained in the absence of lithium. As demonstrated in the Examples, increasing levels of lithium carbonate employed as a starting material results first in an increase in overall luminescence eventually followed by a decrease in overall luminescence attributed to the formation of increasingly larger proportions of lithium hafnate. On the other hand, employing lithium sulfate as a starting material, increasing proportions result in peak luminescence with still higher proportions of lithium sulfate resulting in a relatively constant high level of luminescence, indicating that the proportion of lithium hafnate which is formed as a second phase is limited at higher lithium sulfate concentrations in the starting materials.

Sodium and potassium compounds employed as starting materials in place of lithium compounds also result in markedly increased levels of phosphor luminescence. These alkali metal starting materials, of course, avoid any possibility of forming a lithium hafnate second phase and can therefore be employed well above the preferred maximum concentration levels of lithium starting materials without any performance penalty. On the other hand, it has been observed that sodium and potassium ions are quite effective at lower concentrations. Therefore, when M in relationship IV represents at least one of sodium and potassium, y is preferably in the range of from $6 \times 10^{-4}$ to $7 \times 10^{-2}$ (optimally from $8 \times 10^{-4}$ to $7 \times 10^{-2}$).

The alkali metals cesium and rubidium are also effective to increase phosphor luminescence, but to a lesser extent that than lithium, sodium, and potassium.

It has been discovered quite unexpectedly that the highest levels of luminescence are achieved when at least one Group 14 element is employed as a dopant in combination with more than one alkali metal. Further, very high levels of luminescence are achieved in a single firing. This has the highly practical advantage of allowing the second firing step discussed above to be eliminated while still achieving fully satisfactory phosphor emission levels. In one preferred form of the invention the alkali metals present in the phosphor satisfy the relationship:

$$(M^1)_{y^1}(M^2)_{y^2} \tag{VIII}$$

where $M^1$ is an alkali metal chosen from the group consisting of lithium, sodium and potassium;

$M^2$ is at least one alkali metal other than that represented by $M^1$;

$y^1 + y^2 = y$; and $y^1$ and $y^2$ are each at least $1 \times 10^{-6}$ (preferably at least $1 \times 10^{-5}$).

Surprisingly, the heavier alkali metals cesium and rubidium when employed in combination with one or more of the lighter alkali metals in the Group 14 element doped phosphor provide performance levels equal to those obtained with combinations of the lighter alkali metals. In formula VIII above $M^1$ is preferably lithium and is specifically contemplated to satisfy relationship VI above. The remaining alkali metal forming $M^2$ can be any one or combination of sodium, potassium, cesium and rubidium.

Surprisingly, in the Group 14 element doped phosphors combinations of at least three alkali metals yield the highest levels of observed performance. Although ternary combinations which exclude lithium are possible, it is preferred that $M^1$ in relationship VIII be lithium with $(M^2)_y 2$ satisfying the relationship:

$$M'_{y'}M''_{y''} \tag{IX}$$

where $M'$ is at least one of sodium and potassium;

$M''$ is at least one other alkali metal; and $y'$ and $y''$ are each at least $1 \times 10^{-6}$.

In a specifically contemplated ternary alkali metal form of the invention $M^1$ is lithium and $M'$ is potassium with the remaining alkali metal being chosen from among sodium, cesium and rubidium. When the third alkali metal is cesium or rubidium, $y''$ is preferably in the range of from $1 \times 10^{-5}$ to 0.1 and optimally in the range of from $5 \times 10^{-5}$ to $5 \times 10^{-3}$.

The phosphors of this invention include a titanium activator. Any conventional level of titanium known to be useful as an activator for zirconia, hafnia or germania can be employed. Titanium (e.g., $Ti^{+4}$), taught for use in optical grade hafnia by Brixner and Kroger, each cited above, is specifically contemplated for use as an activator. Thus, in one preferred form of the zirconium hafnium oxide phosphors of the invention hafnium, zirconium, and titanium are present and satisfy the relationship $$Hf_{1-z}Zr_zTi_x \tag{X}$$

where x is the range of from $3 \times 10^{-4}$ to 1.0 (preferably 0.5 and optimally 0.25) and z satisfies any of the ranges previously indicated.

It is possible to introduce the titanium activator by physically mixing titania with any of the host phosphor forming materials described above. It has been discovered, however, that higher luminescence levels at lower titanium concentrations are possible when the titanium activator in the form of a thermally decomposable compound is physically blended with thermally decomposable hafnium and zirconium compounds. The thermally decomposable moieties of the titanium activator compounds can be selected from among the same compound classes described in connection with hafnium and zirconium. Titanium carboxylates, where the carboxylates are chosen as described above, are specifically contemplated as starting materials for the incorporation of titanium.

The inclusion of titanium in the host phosphor not only greatly increases the total luminescence of the phosphor, but also shifts the maximum emission wavelength of the phosphor from the ultraviolet to the blue portion of the spectrum. Emissions in the blue portion of the spectrum are more useful for intensifying screen use, since the silver halide emulsions of radiographic elements which are employed in combination with intensifying screens possess native blue sensitivity and/or can be readily spectrally sensitized to these wavelengths while the organic vehicle of the emulsion is transparent in the blue portion of the spectrum.

Since the zirconium hafnium oxide phosphors include both alkali metal ion and titanium, each introduced as described above, the relationship of the metal ingredients discussed above satisfies the relationship:

$$Hf_{1-z}Zr_zM_yTi_x \tag{XI}$$

where M, x, y, and z are as previously defined.

It has been surprisingly discovered that disproportionately large enhancements of luminescence are realized when both alkali metal ion and titanium are incorporated in the phosphor. That is, the luminescence increases imparted by each of the alkali metal ion and titanium alone when added together do not equal or even approach the magnitude of the luminescence increase imparted by a combination of alkali metal ion and titanium employed together in the phosphor.

In addition to the ingredients described above the phosphors can optionally contain one or a combination of indium and scandium both to increase speed and to decrease afterglow.

In addition to the ingredients described above the phosphors can optionally contain one or a combination of rare earths to reduce phosphor afterglow. The rare earths yttrium, neodymium, samarium, europium, gadolinium, holmium, erbium, thulium and ytterbium have been found to be effective. The inclusion of the rare earths in titanium activated zirconium hafnium oxide phosphors is the subject of the following commonly assigned filings:

| Rare Earth | U.S. Pat. No. | Filing Date |
|---|---|---|
| Eu | 4,980,559 | Nov. 15, 1989; |
| Er | 4,963,753 | Nov. 16, 1989; |
| Ho | 4,972,516 | Nov. 16, 1989; |
| Y | 5,017,791 | Nov. 16, 1989; |
| Gd | 4,963,753 | Nov. 16, 1989; |
| Lu | 4,975,588 | Nov. 16, 1989; |
| Tm | 4,963,754 | Nov. 16, 1989; |
| Nd | 4,967,085 | Nov. 16, 1989; |
| Sm | 4,961,004 | Nov. 16, 1989; |
| Yb | 4,967,004 | Nov. 16, 1989; |

Each of these patent applications is allowed and here incorporated by reference. In the practice of this invention one or more of the rare earths are optionally incorporated in the Group 14 element doped titanium activated zirconium hafnium oxide phosphor in an amount sufficient to reduce afterglow. The rare earth elements satisfy the following relationship to the phosphor elements described above:

$$Hf_{1-z}Zr_zM_yTi_xL_w \quad (XII)$$

wherein

L is one or more rare earth selected from among those having an atomic number of 39, 60, 62 to 64 inclusive, and 67 to 71 inclusive;

w is from 0 to $10^{-2}$; and

M, x, y, and z are as previously defined.

Effective levels of selected rare earth vary, depending upon the specific rare earth chosen.

When L is yttrium (Y), ytterbium (Yb), or lutetium (Lu), w is in the range of from $1 \times 10^{-6}$ to $1 \times 10^{-3}$, preferably $2 \times 10^{-6}$ to $5 \times 10^{-4}$; and optimally from $3 \times 10^{-6}$ to $3 \times 10^{-4}$.

When L is erbium (Er) or holmium (Ho), w is in the range of from $1 \times 10^{-6}$ to $5 \times 10^{-4}$, preferably $1 \times 10^{-5}$ to $2 \times 10^{-4}$.

When L is samarium (Sm), w is in the range of from $1 \times 10^{-4}$ to $5 \times 10^{-3}$, preferably $2 \times 10^{-4}$ to $3 \times 10^{-4}$.

When L is europium (Eu), w is in the range of from $1 \times 10^{-6}$ to $1 \times 10^{-2}$, preferably $1 \times 10^{-5}$ to $5 \times 10^{-3}$, and optimally from $2 \times 10^{-4}$ to $2 \times 10^{-3}$.

When L is gadolinium (Gd), w is in the range of from $2 \times 10^{-6}$ to $1 \times 10^{-2}$, preferably $1 \times 10^{-5}$ to $2 \times 10^{-3}$, and optimally from $4 \times 10^{-4}$ to $5 \times 10^{-4}$.

When L is thulium (Tm), w is in the range of from $1 \times 10^{-6}$ to $1 \times 10^{-3}$, preferably $2 \times 10^{-6}$ to $3 \times 10^{-4}$, and optimally from $5 \times 10^{-5}$ to $2 \times 10^{-4}$.

In a specific preferred form of the invention the rare earth is neodymium. Neodymium has the capability of reducing and, in preferred concentrations, eliminating for all practical purposes phosphor afterglow. In a preferred form the neodymium containing phosphor satisfies the following relationship to the phosphor elements described above:

$$Hf_{1-z}Zr_zM_yTi_xNd_{w'} \quad (XIII)$$

wherein

M, x, y, and z are as previously defined and w' is up to $5 \times 10^{-4}$; preferably from $5 \times 10^{-8}$ to $2 \times 10^{-4}$ and optimally from $2 \times 10^{-6}$ to $1 \times 10^{-5}$.

It has been further observed that prompt emission intensity of the Group 14 doped titanium activated zirconium hafnium oxide phosphors of this invention can be increased and afterglow reduced by incorporating one or a combination of indium and scandium. The discovery of this utility for indium and scandium in zirconium hafnium oxide phosphors is the specific subject matter of commonly assigned filings:

| Dopant | U.S. Pat. No. | Filing Date |
|---|---|---|
| In | 4,983,847 | Nov. 16, 1989; |
| Sc | 4,980,560 | Nov. 16, 1989; |

Each of these patent applications is allowed and here incorporated by reference. In the practice of this invention one or both of indium and scandium are optionally incorporated in the Group 14 element doped titanium activated zirconium hafnium oxide phosphor in an amount sufficient to increase prompt emission and reduce afterglow. Indium and scandium satisfy the following relationship to the required phosphor elements described above:

$$Hf_{1-z}Zr_zM_yTi_xG_v \quad (XIV)$$

wherein

M, x, y, and z are as previously defined;

G is at least one of indium and scandium; and v is in the range of from 0 to $1 \times 10^{-2}$.

When G is indium, v is preferably $1 \times 10^{-6}$ to $5 \times 10^{-3}$; optimally $2 \times 10^{-6}$ to $1 \times 10^{-3}$. When G is scandium, v is preferably $1 \times 10^{-6}$ to $1 \times 10^{-2}$; optimally $2 \times 10^{-6}$ to $5 \times 10^{-3}$.

It is specifically contemplated to employ indium and scandium in combination with one or more rare earth elements. In this instance the following relationship applies:

$$Hf_{1-z}Zr_zM_yTi_xL_wG_v \quad (XV)$$

wherein G, L, M, v, w, x, y, and z are as previously defined.

In a specifically preferred form of the invention the rare earth selected is neodymium and the following relationship applies:

$$Hf_{1-z}Zr_zM_yTi_xNd_{w'}G_v \quad (XVI)$$

wherein G, M, v, w', x, y, and z are as previously defined.

It is the specific discovery of this invention that Group 14 elements of Periods 3, 4 and 5 when incorporated in titanium activated zirconium hafnium oxide also containing at least one alkali metal further enhance phosphor emission. These Group 14 elements are silicon, germanium and tin, and it is specifically contemplated to incorporate these elements in the phosphor as a dopant in any concentration capable of enhancing phosphor emission. It has been observed that incorporating levels of the Group 14 element during phosphor preparation in excess of that capable of being incorporated as a dopant in the phosphor crystal structure does not detract from the effectiveness of the dopant. It is thus contemplated to incorporate the Group 14 element in the phosphor host in any effective concentration up to its solubility limit in the host phosphor. Silicon and germanium are the preferred Group 14 dopants. These dopants increase prompt emission to higher levels than can be achieved in their absence.

It is broadly contemplated to incorporate one or a combination of Group 14 elements to satisfy the relationship:

$$Hf_{1-z}Zr_zE_e \qquad \text{(XVII)}$$

where
E is at least one Group 14 dopant chosen from Periods 3, 4 and 5;
e is in the range of from greater than $1 \times 10^{-3}$ up to the solubility limit of the Group 14 dopant in the phosphor host; and
z is as previously defined.

In a specifically preferred form of the invention E is germanium or silicon and e is in the range of from greater than $1 \times 10^{-3}$ (most preferably at least $2 \times 10^{-3}$) to 0.1. Optimally e is in the range of from $5 \times 10^{-3}$ to $8 \times 10^{-2}$.

When the relationships discussed above are modified to include the Group 14 element, the following relationships exist:

$$Hf_{1-z}Zr_zM_yE_e \qquad \text{(XVIII)}$$

$$Hf_{1-z}Zr_zM_mE_e \qquad \text{(XIX)}$$

$$Hf_{1-z}Zr_zLi_yE_e \qquad \text{(XX)}$$

$$Hf_{1-z}Zr_zTi_xE_e \qquad \text{(XXI)}$$

$$Hf_{1-z}Zr_zM_yTi_xE_e \qquad \text{(XXII)}$$

$$Hf_{1-z}Zr_zM_yTi_xL_wE_e \qquad \text{(XXIII)}$$

$$Hf_{1-z}Zr_zM_yTi_xNd_{w'}E_e \qquad \text{(XXIV)}$$

$$Hf_{1-z}Zr_zM_yTi_xG_vE_e \qquad \text{(XXIV)}$$

$$Hf_{1-z}Zr_zM_yTi_xL_wG_vE_e \qquad \text{(XXV)}$$

$$Hf_{1-z}Zr_zM_yTi_xNd_{w'}G_vE_e \qquad \text{(XXVI)}$$

wherein G, L, M, v, w, w', x, y, and z are as previously defined.

In a preferred form of the invention the monoclinic phosphor crystals incorporated in the intensifying screens of the this invention consist essentially of oxygen and elements satisfying the relationship:

$$Hf_{1-z}Zr_zM_yTi_xL_wG_vE_e \qquad \text{(XXVII)}$$

wherein
E represents at least one of germanium and silicon;
e ranges from greater than $1 \times 10^{-3}$ to 0.1;
G represents at least one indium and scandium;
v ranges from 0 to $1 \times 10^{-2}$;
L represents a rare earth selected from among those have an atomic number of 39, 60, 62 to 64 inclusive, and 67 to 71 inclusive;
w ranges from 0 to $1 \times 10^{-2}$;
M represents at least one alkali metal;
y is in the range of from $6 \times 10^{-4}$ to 0.3;
x is in the range of from $3 \times 10^{-4}$ to 1.0; and
z is in the range of from $4 \times 10^{-4}$ to 0.3.

In a more specifically preferred form of the invention the monoclinic phosphor crystals incorporated in the intensifying screens of the this invention consist essentially of oxygen and elements satisfying the relationship:

$$Hf_{1-z}Zr_zM_yTi_xNd_{w'}In_vE_e \qquad \text{(XVIII)}$$

wherein
E represents at least one of germanium and silicon;
e ranges from greater than $1 \times 10^{-3}$ to 0.1;
v ranges from 0 to $5 \times 10^{-3}$;
w' ranges from 0 to $5 \times 10^{-4}$;
M represents at least one alkali metal;
y is in the range of from $6 \times 10^{-4}$ to 0.3;
x is in the range of from $3 \times 10^{-4}$ to 1.0; and
z is in the range of from $4 \times 10^{-4}$ to 0.3.

In still more specifically preferred forms of the invention the preferred and optimum concentration ranges of the elements included in relationships XXVII and XXVIII are present.

The phosphors described above, once formed to satisfy the composition requirements of this invention, can be employed to form an intensifying screen of any otherwise conventional type. In its preferred construction the intensifying screen is comprised of a support onto which is coated a fluorescent layer containing the phosphor in particulate form and a binder for the phosphor particles. The phosphors can be used in the fluorescent layer in any conventional particle size range and distribution. It is generally appreciated that sharper images are realized with smaller mean particle sizes. Preferred mean particle sizes for the phosphors of this invention are in the range of from from 0.5 μm to 40 μm, optimally from 1 μm to 20 μm. It has been observed that presence of a Group 14 dopant reduces the size dispersity of particles obtained. In other words, the coefficient of variation of the particles is reduced. This is helpful both in terms of improving the physical uniformity of fluorescent layers and the uniformity of emission from these layers.

It is, of course, recognized that the particles of the phosphor described above can be blended with other, conventional phosphor particles, if desired, to form an intensifying screen having optimum properties for a specific application. Intensifying screen constructions containing more than one phosphor containing layer are also possible, with the phosphor described above being present in one or more of the phosphor containing layers.

The fluorescent layer contains sufficient binder to give structural coherence to the fluorescent layer. The binders employed in the fluorescent layers can be identical to those conventionally employed in fluorescent screens. Such binders are generally chosen from organic polymers which are transparent to X-radiation and emitted radiation, such as sodium o-sulfobenzaldehyde acetal of poly(vinyl alcohol); chlorosulfonated poly(ethylene); a mixture of macromolecular bisphenol poly(carbonates) and copolymers comprising bisphenol carbonates and poly(alkylene oxides); aqueous ethanol soluble nylons; poly(alkyl acrylates and methacrylates) and copolymers of alkyl acrylates and methacrylates with acrylic and methacrylic acid; poly(vinyl butyral); and poly(urethane) elastomers. These and other useful binders are disclosed in U.S. Pat. Nos. 2,502,529; 2,887,379; 3,617,285; 3,300,310; 3,300,311; and 3,743,833; and in *Research Disclosure*, Vol. 154, February 1977, Item 15444, and Vol. 182, June 1979. Particularly preferred intensifying screen binders are poly(urethanes), such as those commercially available under the trademark Estane from Goodrich Chemical Co., the trademark Permuthane from the Permuthane Division of ICI, Ltd., and the trademark Cargill from Cargill, Inc.

The support onto which the fluorescent layer is coated can be of any conventional type. Most commonly, the support is a film support. For highest levels of image sharpness the support is typically chosen to be black or transparent and mounted in a cassette for exposure with a black backing. For the highest attainable speeds a white support, such as a titania or barium sulfate loaded or coated support is employed. Specifically preferred reflective supports offering the highest attainable balance of speed and sharpness are those containing reflective microlenslets, disclosed by Roberts et al U.S. Pat. No. 4,912,333, the disclosure of which is here incorporated by reference.

Any one or combination of conventional intensifying screen features, such as overcoats, subbing layers, and the like, compatible with the features described above can, of course, be employed. Both conventional radiographic element and intensifying screen constructions are disclosed in *Research Disclosure*, Vol. 184, August 1979, Item 18431, the disclosure of which and the patents cited therein are here incorporated by reference. *Research Disclosure* is published by Kenneth Mason Publications, Ltd., Emsworth, Hampshire P010 7DD, England.

In one specifically preferred form of the invention, illustrating intensifying screens satisfying the requirements of the invention intended to be employed with a separate silver halide emulsion layer containing radiographic element, the phosphors described above can be substituted for any of the conventional phosphors employed in either the front or back intensifying screens of Luckey, Roth et al U.S. Pat. No. 4,710,637, the disclosure of which is here incorporated by reference. Similar modification of any of the conventional intensifying screens disclosed in the following patents is also contemplated: DeBoer et al U.S. Pat. No. 4,637,898; Luckey, Cleare et al U.S. Pat. No. 4,259,588; and Luckey U.S. Pat. No. 4,032,471.

EXAMPLES

The invention can be better appreciated by reference to the following specific examples. Percentages in the examples are in each instances mole percentages based on hafnia, unless otherwise stated.

EXAMPLE 1

The purpose of presenting this investigation is to demonstrate the preparation and performance of a phosphor prepared from a hafnium source without the inclusion of either a Group 14 element of cesium metal in the synthesis.

The starting material complex hafnyl oxalic acid 3-hydrate was prepared in the manner described in Zhurnal Neoorganicheskoi Khimi, Vol II, 980 (1957) using Reactor Grade Special hafnium oxychloride 8-hydrate. Zirconium oxychloride 8-hydrate was added as needed to adjust the molar zirconium level to $Hf=0.99$ and $Zr=0.01$. The oxychlorides were obtained from Teledyne Wah Chang Albany (located at Albany, Oreg.) and used as received.

A sample consisting of 0.0265 mole of hafnyl oxalic acid was ground together with 0.00318 mole of $Li_2CO_3$ (Aldrich Chemical Co., 99.997%), 0.00398 mole of $K_2SO_4$ (Mallinkrodt Analytical Reagent), 0.00106 mole $TiO_2$ (Aldrich Chemical Co., 99.99%), and 0.0000033 mole of $In_2O_3$ (Alfa, Ultrapure) in a glass mortar and pestle. The mixture was placed in a 50 mL alumina crucible which was covered with an alumina lid. The crucible was placed in an alumina boat which was loaded into a mullite tube contained in a tube furnace. The sample was heated in air to 1000° C. over 2.5 hours and then held at that temperature for an additional 2.5 hours.

After cooling to room temperature, the ingot was removed, broken into small chunks, and ground to a powder in an agate mortar and pestle. The powder was stirred in 150 ml of distilled water for 1 hour. The solid was collected by suction filtration and dried in a 500W CEM Model MDS-81 TM microwave oven.

The luminescence response of the phosphor powder was in this and all subsequent Examples measured by placing the phosphor powder sample in aluminum planchets (2 mm high × 24 mm diam) at a coverage of about 1.1 g/cm² and exposing to X-radiation. The X-ray response was obtained using a tungsten target X-ray source in an XRD 6 TM generator. The X-ray tube was operated at 70 kVp and 10 mA, and the X-radiation from the tube was filtered through 0.5 mm Cu and 1 mm Al filters before reaching the sample. The luminescent response was measured using an IP-28 TM photomultiplier tube at 500 V bias. The voltage from the photomultiplier was measured with a Keithley TM high impedance electrometer and is proportional to the total light output of the sample.

To facilitate the comparison with the phosphors prepared in subsequent examples, the phosphor of this Example was assigned a relative luminescence of 100. The luminescence response of all subsequent examples (but excluding the examples of the Appendix) are reported relative to this response.

To simplify the writing of the preparations the source of the starting reagents will not be given again after they are first listed unless the reagents are obtained from a new source.

EXAMPLE 2

This sample illustrates the improvement that can be obtained in relative response by the addition of cesium to the preparation of Example 1.

The sample was prepared as described in Example 1 except that 0.00053 mole of $Cs_2SO_4$ (Alfa, Ultrapure)

was added and ground with the initial mixture. The relative intensity is given in Table I.

EXAMPLE 3a

This sample illustrates the improvement that can be obtained in relative response by the addition of germanium to the preparation of Example 1.

The sample was prepared as described in Example 1 except that 0.00040 mole of $GeO_2$ (Alfa, Ultrapure) was added and ground with the initial mixture. The relative intensity is given in Table I.

EXAMPLE 4

This sample illustrates the improvement that can be obtained in relative response by the addition of both cesium and germanium to the preparation of Example 1.

The sample was prepared as described in Example 1 except that 0.00040 mole of $GeO_2$ and 0.00053 mole of $Cs_2SO_4$ was added and ground with the initial mixture. The relative intensity is given in Table I.

SECOND FIRING OF EXAMPLES 1–4

The samples described above were treated further. They were placed in 20 mL alumina crucibles in ambient air, covered, and heated to 1200° C. in a box furnace and maintained at that temperature for 1.5 hours before being allowed to cool to room temperature. The relative intensities are given in Table I.

TABLE I

| Example | Added | Relative Intensity | |
|---|---|---|---|
| 1 (Control) | — | 100 | 470* |
| 2 | 2% $Cs_2SO_4$ | 153 | 560* |
| 3a | 1.5% $GeO_2$ | 407 | 768* |
| 4 | 2% $Cs_2SO_4$ + 1.5% $GeO_2$ | 499 | 710* |

*Second Fire at 1200° C. for 1.5 h.

EXAMPLE 5

This sample illustrates the improvement that can be obtained in relative response by the addition of cesium to the preparation of Example 3.

The sample was prepared as described in Example 3 except that 0.000265 mole of $Cs_2SO_4$ (Alfa Inorganics, Ultrapure) was added and ground with the initial mixture. The relative intensity and the relative afterglow are given in Table II.

The afterglow characteristics of each phosphor sample were determined by placing the sample in a chamber and exposing it to X-radiation from a tungsten target, beryllium window tube operated at 70 kVp and 10 mA, filtered with 0.5 mm Cu and 1 mm Al. The phosphor samples were prepared by placing the phosphor powder in aluminum planchets (2 mm deep × 24 mm diameter) at a coverage of about 1.1 g/cm². The emitted light was detected by a photomultiplier tube, the output current of which was measured by a voltmeter across a load resistor. The voltmeter reading served as an input to an x-y recorder which plotted the variation of voltage as a function of time. Constant irradiation by X-rays of each sample produced a steady state reading of the voltmeter, which was adjusted to 100% on the x-y recorder. The X-radiation was then shut off, and the decay of the light emitted by each sample was monitored. The elapsed time required for the signal to decay to 1% of its steady state value was then read off the x-y plot. The minimum elapsed time measurable by this technique was 0.35 second. The afterglow value obtained for Example 6 was defined as 100.

Example 6

This sample does not contain indium, and is provided to demonstrate, when compared to Example 5, the observed increase in relative response upon indium addition.

This sample was prepared as described in Example 5, except that indium oxide was not added to the preparation. The relative intensity is given in Table II. The afterglow value of this sample was defined as 100.

EXAMPLE 7

This sample illustrates the improvement that can be obtained in relative afterglow by the addition of neodymium to the preparation of Example 5.

This sample was prepared as described in Example 5, except that 0.0000050 mole of neodymium was added to the preparation. The neodymium ions were provided in the form of aqueous solutions of $Nd(NO_3)_3 \cdot 5H_2O$ (Alfa, 99.9%). The relative intensity and the relative afterglow are given in Table II.

TABLE II

| Example | Added | Relative Intensity | Relative Afterglow |
|---|---|---|---|
| 3b | 0.0125% $In_2O_3$ | 407 | 39 |
| 5 | 0.0125% $In_2O_3$ 1% $Cs_2SO_4$ | 615 | 50 |
| 6 | 1% $Cs_2SO_4$ | 454 | 100 |
| 7 | 1% $Cs_2O_4$ + 0.0125% $In_2O_3$ + 0.0005% $Nd(NO_3)_3$ | 470 | 5 |

EXAMPLES 8–15

These samples illustrate the improvement that can be obtained in relative response by the addition of cesium to the preparation of Example 3. The addition of increasing amounts of cesium beyond those listed in Table III is expected to give substantially similar phosphor performance.

To provide the best possible control for purposes of comparison, several Example 3 control samples were prepared. During each firing set one of the control samples was present so that the control would experience exactly the same firing conditions as samples under investigation. For the sample sets described in Tables III and IV, Example 3 was an average of the controls fired with this group of phosphor samples.

The samples were prepared as described in Example 3 except that varying amounts of $Cs_2SO_4$ (Alfa Inorganics, Ultrapure) were added and ground with the initial mixtures. The relative intensity and the mole percent of cesium sulfate (based on Hf) added to each sample are given in Table III.

TABLE III

| Example | % $Cs_2SO_4$ | Relative Intensity |
|---|---|---|
| 3c | 0 | 407 |
| 8 | 0.1 | 448 |
| 9 | 0.2 | 473 |
| 10 | 1 | 657 |
| 11 | 2 | 601 |
| 12 | 5 | 573 |
| 13 | 10 | 556 |
| 14 | 25 | 546 |
| 15 | 50 | 511 |

EXAMPLES 16-25

These examples illustrate the improvement in relative intensity that can be obtained compared to Example 3 by the addition of alkali metal salts other than cesium, the effect of which is demonstrated in Examples 8-15. Examples 25a and b show that these lithium salts are not effective, while Examples 25c and d show that these alkaline earth salts are also not effective.

The samples were prepared as described in Example 3 with the exception that a certain mole percent (based on Hf) of various alkali metal salts as listed in Table IV were added and ground with the initial mixtures. The sources for the various reagents are as follows: cesium chloride, Alfa, 99.9%; cesium oxalate, Alfa; cesium fluoride, Varlacoid Chemical Co., 99%; cesium carbonate, Aesar, 99.9%; rubidium sulfate, Alfa Ultrapure; rubidium bromide, Cabot, 99.9%; rubidium chloride, Alfa, 99.7%; sodium sulfate, Baker, Analyzed Reagent; postassium chloride, Alfa, Ultrapure; lithium molydate, Aesar, 99%; lithium chloride, Alfa, Ultrapure; calcium chloride, Great Western Inorganics, 99.99%; strontium chloride, Alfa, 99%. The relative intensities of the examples are given in Table IV.

TABLE IV

| Example | Added | Relative Intensity |
|---|---|---|
| 3 | — | 407 |
| 11 | 2% $Cs_2SO_4$ | 601 |
| 16 | 2% CsCl | 601 |
| 17 | 2% $Cs_2C_2O_4$ | 657 |
| 18 | 4% CsF | 639 |
| 19 | 2% $Cs_2CO_3$ | 549 |
| 20 | 2% $Rb_2SO_4$ | 577 |
| 21 | 4% RbBr | 472 |
| 22 | 4% RbCl | 542 |
| 23 | 2% $Na_2SO_4$ | 622 |
| 24 | 4% KCl | 618 |
| 25a | 2% $Li_2MoO_4$ | 233 |
| 25b | 4% LiCl | 239 |
| 25c | 4% $CaCl_2$ | 236 |
| 25d | 4% $SrCl_2$ | 156 |

EXAMPLE 26

This example is provided both to show the effect of the addition of cesium to Example 1 and to serve as a control for Example Set 26-31. Example 26 does not contain $GeO_2$ or $SiO_2$.

The sample was prepared as described in Example 1, except that 0.000265 mole of $Cs_2SO_4$ (Alfa, Ultrapure) was added and ground with the initial mixture. The relative intensity is given in Table V.

These examples illustrate the improvement in relative intensity as a function of mole percent of added $GeO_2$.

The samples were prepared as described in Example 26 with the exception that a certain mole percent of $GeO_2$ was added and ground with the initial mixture. The relative intensities along with the mole percent (based on Hf content) of germanium oxide are given in Table V.

EXAMPLES 31a-31c

This example illustrates the effect on relative intensity as a function of mole percent of added $SiO_2$.

The sample was prepared as described in Example 26 with the exception that a certain mole percent of $SiO_2$ was added and ground with the initial mixture. The relative intensity along with the mole percent (based on Hf content) of silicon oxide are given in Table V.

SECOND FIRING

The samples described above were treated further. They were placed in 20 ml alumina crucibles in ambient air, covered, and heated to 1400° C. in a box furnace and maintained at that temperature for 1.5 hours before being allowed to cool to room temperature. The relative intensities are given in Table V.

TABLE V

| Example | Added | Relative Intensity | |
|---|---|---|---|
| 26 | 0 | 212 | 723* |
| 27 | 0.2% $GeO_2$ | 288 | |
| 10 | 1.5% $GeO_2$ | 657 | 737* |
| 28 | 5% $GeO_2$ | 803 | 682* |
| 29 | 10% $GeO_2$ | 343 | |
| 30 | 20% $GeO_2$ | 115 | 790* |
| 31a | 5% $SiO_2$ | 281 | 803* |
| 31b | 3% $SiO_2$ | 204 | 772* |
| 31c | 1.5% $SiO_2$ | 194 | 765* |
| 3e** | 1.5% $GeO_2$ | 407 | 790* |

*Second Fire at 1400° C. for 1.5 h.
**No cesium was added

EXAMPLE 32

This example is presented as a control for Examples 33-52 and for Examples 53-61. It contains neither germanium nor silicon.

To provide the best possible control for purposes of comparison, several Example 32 control samples were prepared. During each firing set, one of the control samples was present so that the control would experience exactly the same firing conditions as samples under investigation. For the sample sets described in Tables VI and VII, Example 32 was an average of the controls fired with this group of phosphor samples.

A hydrous hafnia precursor was prepared by a conventional preparation method. Suitable methods are those disclosed for preparing hydrous zirconia by M. Shibagaki, K. Takahasi, and M. Matsushita, Bull. Chem. Soc. Japan, 61, 3283 (1988) and A. Benedetti, G. Fagherazzi, and F. Pinna, J. Am. Ceram. Soc., 72, 467 (1989). One mole of R.G.S. hafnium oxychloride from Teledyne Wah Chang Albany was dissolved in 1.0 liter of distilled water. The mole ratio was adjusted to 0.99 Hf/0.01 Zr with zirconium oxychloride if the Zr level of the starting hafnium oxychloride was lower than 0.01. Sodium hydroxide pellets (2.1 mole) were dissolved in 1.0 liter of distilled water. The solutions were added simultaneously to a precipitation vessel with rapid stirring. The resulting gelatinous solid was collected by vacuum filtration and then dried using a rotary evaporator. The solid was washed three times with 4 liters of distilled water. The collected material was then dried for 16 hours at 50° C. in a convection oven.

A sample consisting of 0.0265 mole of precursor hydrous hafnia was ground together with 0.00318 mole of $Li_2CO_3$ (Aldrich Chemical Co., 99.997%), 0.00398 mole of $K_2SO_4$ (Mallinckrodt Analytical Reagent), and 0.00132 mole $TiO_2$ (Aldrich Chemical Co., 99.99%) in an agate mortar and pestle. The mixture was placed in a 20 ml alumina crucible which was covered with an alumina lid. The crucible was placed in an alumina boat which was loaded into a mullite tube contained in a tube furnace. The sample was heated in air to 1000° C. over 2.5 hours and then held at that temperature for an additional 2.5 hours.

After cooling to room temperature, the ingot was removed, broken into small chunks, and ground to a powder in an agate mortar and pestle. The powder was stirred in 150 mL of distilled water for 1 hour. The solid was collected by suction filtration and dried in a 500W CEM Model MDS-81 TM microwave oven. The sample was then returned to its 20 mL crucible in ambient air, covered, and heated to 1000° C. in a box furnace and maintained at that temperature for 2.5 hours before being allowed to cool to room temperature. The resulting powder was ground to give a uniform phosphor powder. The relative intensity of luminescence was measured as described in Example 1.

EXAMPLES 33-52

The purpose of this investigation is to demonstrate the performance of a phosphor prepared with varying amounts of germanium.

The samples were prepared as described in Example 32, except that varying amounts of $GeO_2$ were added and ground with the initial mixtures. The relative intensity and the mole percent of germanium oxide (based on Hf content) added to each sample are given in Table VI.

TABLE VI

| Example | % GeO$_2$ | Relative Intensity |
| --- | --- | --- |
| 32a Control | 0 | 390 |
| 33 | 0.1 | 402 |
| 34 | 0.15 | 417 |
| 35 | 0.20 | 452 |
| 36 | 0.30 | 433 |
| 37 | 0.50 | 441 |
| 38 | 1 | 538 |
| 39 | 1.5 | 546 |
| 40 | 3 | 546 |
| 41 | 5 | 616 |
| 42 | 6 | 554 |
| 43 | 8 | 503 |
| 44 | 10 | 351 |
| 45 | 11 | 421 |
| 46 | 12 | 402 |
| 47 | 13 | 382 |
| 48 | 14 | 347 |
| 49 | 15 | 261 |
| 50 | 20 | 199 |
| 51 | 30 | 156 |
| 52 | 40 | 164 |

EXAMPLES 53-61

The purpose of this investigation is to demonstrate the performance of a phosphor prepared with varying amounts of silicon.

The samples were prepared as described in Example 32 except that varying amounts of $SiO_2$ (Cabot, CAB-O-SIL TM, M-5, Scintillation Grade) were added and ground with the initial mixtures. The relative intensity and the mole percent of silicon dioxide (base on Hf content) added to each sample are given in Table VII.

TABLE VII

| Example | % SiO$_2$ | Relative Intensity |
| --- | --- | --- |
| 32b | 0 | 390 |
| 53 | 0.5 | 410 |
| 54 | 1 | 476 |
| 55 | 3 | 449 |
| 56 | 5 | 554 |
| 57 | 7 | 507 |
| 58 | 10 | 417 |
| 59 | 15 | 370 |
| 60 | 20 | 308 |

TABLE VII-continued

| Example | % SiO$_2$ | Relative Intensity |
| --- | --- | --- |
| 61 | 40 | 74 |

EXAMPLE 62

The purpose of this investigation is to provide a control for Example 63.

The sample was prepared as described in Example 32 except that the second furnace firing was heated to 1300 instead of 1000° C. and the charge was held at that temperature for 1.5 hour instead of 2.5 hours. The relative afterglow is defined to be 100 for this sample. The values are displayed in Table VIII.

EXAMPLE 63

The purpose of this example is to demonstrate the effect of the addition of germanium on the afterglow and the particle size distribution of the phosphor.

The sample was prepared as described in Example 62 except that 0.0008 mole of geramnium oxide (3.0 mole percent based on Hf content) was added to the initial mixture before grinding.

The particle size effect was determined from photomicrographs taken of the particles at a magnification of 600X. Three hundred particles were measured for each determination. Particles less than one micron in diameter were excluded. The results are given in Table VIII.

TABLE VIII

| | Example | |
| --- | --- | --- |
| | 62 | 63 |
| Addenda | 0 | 3% GeO$_2$ |
| Relative Intensity | 696 | 664 |
| Relative Afterglow | 100 | 70 |
| Mean Area (Sq. microns) | 49.8 | 22.8 |
| Standard Deviation | 46.5 | 16.8 |
| Coefficient of Variation | 93.2 | 73.9 |
| Equivalent Circular Diameter | 7.97 | 5.38 |

EXAMPLE 64

When compared to Example 3, this sample illustrates the effect on relative luminescence of the addition of potassium to the phosphor formulation. Example 64 contains no potassium.

The sample was prepared as described in Example 3 except that no potassium sulfate was added to the mixture. The relative intensity is given in Table XI.

EXAMPLES 65-69

These examples show the effect of adding cesium to the preparation of Example 64. Improvements are realized at the higher loadings of cesium. Example 68 shows an improvement over Example 3f which contains potassium sulfate at the same molar level of cesium sulfate.

These samples were prepared as described for Example 64, except that various amounts of cesium sulfate as given in Table IX were added to the initial mixture before grinding. The relative intensities are given in Table IX.

EXAMPLE 70

This example is provided as a comparison for Example 68. This example contains no germanium.

This sample was prepared as described for Example 68, except that no germanium oxide was added to the initial mixture. The relative intensity is given in Table IX.

TABLE IX

| Example | Added | Relative Intensity |
|---|---|---|
| 3f | 15% K$_2$SO$_4$ | 407 |
| 64 | — | 225 |
| 65 | 1% Cs$_2$SO$_4$ | 188 |
| 66 | 3% Cs$_2$SO$_4$ | 174 |
| 67 | 5% Cs$_2$SO$_4$ | 217 |
| 68 | 15% Cs$_2$SO$_4$ | 742 |
| 69 | 50% Cs$_2$SO$_4$ | 579 |
| 70* | 15% Cs$_2$SO$_4$ | 152 |

*No germanium was added

EXAMPLE 71

This example is provided both to show the effect of temperature (compare Example 3) and to be a control for Examples 72-74.

This sample was prepared as described for Example 3 except that the sample was heated and held at 1040° instead of 1000° C. The relative intensity is given in Table X (Example 1 = 100).

EXAMPLES 72-74

These examples are presented to show the effect of using cesium or rubidium instead of potassium at 1040° C.

These examples were prepared as described for Example 71 except that the molar amounts of either cesium sulfate or rubidium sulfate given in Table X were added and ground in the initial mixture in place of the potassium sulfate. The relative intensities are given in Table X.

TABLE X

| Example | Added | Relative Intensity |
|---|---|---|
| 71 | 15% K$_2$SO$_4$ | 598 |
| 72 | 15% Cs$_2$SO$_4$ | 626 |
| 73 | 15% Rb$_2$SO$_4$ | 605 |
| 74 | 50% Rb$_2$SO$_4$ | 605 |

APPENDIX

The Appendix has as its purpose to include the Examples of commonly assigned filing U.S. Ser. No. 305,222, filed Feb. 3, 1989. These Examples demonstrate additional features of the invention which are not elsewhere disclosed as of the date of filing.

EXAMPLES 1-9

Phosphors Containing Varied Ratios of Hafnium and Zirconium (Hf$_{1-z}$Zr$_z$)

The purpose of presenting these investigations is to demonstrate that, by varying the zirconium content in a hafnia host phosphor, enhanced phosphor luminescence intensity is achieved over a limited zirconium concentration range in which the zirconium content is higher than that found in optical grade hafnium sources, but still only a minor constituent.

Hafnia phosphor samples containing varied amounts of zirconium substituted for hafnium were prepared by the decomposition of the appropriate trilactohafnic and trilactozirconic acid complexes. The complexes were prepared by the general method described in W. B. Blumenthal, "The Chemical Behavior of Zirconium," VanNostrand, Princeton, N.J., 1958, p 333. The varying Hf:Zr ratios are obtained by using the appropriate mixtures of zirconium and hafnium oxychlorides in the precipitation reactions. The oxychlorides were obtained from Teledyne Wah Chang Albany (located at Albany, Oregon) and used as received. The Hf:Zr ratios in the samples were determined from the analytical batch analyses provided by the supplier.

The preparation of trilactohafnic acid for Example 1 was carried out in the following manner: Optical grade (Hf$_{1-z}$Zr$_z$, z=0.000276) hafnium oxychloride (40 g) and ACS reagent lactic acid (44 g) from Eastman Kodak Company were each dissolved in about 120 ml of distilled water. The hafnium oxychloride solution was added to the lactic acid solution with rapid stirring to form a precipitate, and the resulting mixture was heated to 80° C. with continued stirring for about 0.5 hours. The cooled mixture was filtered, and the collected solid was washed with distilled water. After drying for 15 hours at 80° C., the solid weighed 42 g. (for C$_9$H$_{16}$O$_{10}$Hf: theory, C=23.4%, H=3.5%; found, C=22.7%, H=3.5%).

Approximately 13 g of the trilactohafnic acid was placed in a 50 mL alumina crucible, covered with an alumina lid, heated in air to 700° C. for one hour in an ashing furnace, then cooled to room temperature. The solid was transferred to a 20 mL alumina crucible, which was covered with an alumina lid. The covered 20 mL alumina crucible was placed into a 50 mL alumina crucible, which was thereafter covered with an alumina lid. The crucible assembly was heated to 1000° C. and maintained at that temperature for 2.5 hours before cooling to room temperature. The resulting solid was ground with an agate mortar and pestle to give a powder that was returned to the 20 mL alumina crucible. The 20 mL crucible was covered with its alumina lid and then heated to 1400° C. and maintained at that temperature for 1.5 hours before cooling to room temperature. The resulting solid was ground with an agate mortar and pestle to give a uniform phosphor powder.

The Example 1 phosphor powder sample was made from optical grade hafnium oxychloride and contained the lowest amount of zirconium. The Example 5 sample was made from reagent grade (designated by the supplier as Reactor Grade Special and subsequently also referred to as R.G.S.) hafnium (Hf$_{1-z}$Zr$_z$, z=0.019) oxychloride. The Example 2, 3, 4A, and 4B samples were made by mixing appropriate amounts of the optical grade and reagent grade hafnium oxychlorides. The Example 6 to 9 samples were made by mixing appropriate amounts of reagent grade hafnium and zirconium oxychloride to obtain a zirconium content indicated in Table II.

The luminescence response of the phosphor powder was in this and all subsequent Examples measured by placing the phosphor powder sample in aluminum planchets (2 mm high × 24 mm diam) at a coverage of about 1.1 g/cm$^2$ and exposing to X-radiation. The X-ray response was obtained using a tungsten target X-ray source in an XRD 6 ™ generator. The X-ray tube was operated at 70 kVp and 10 mA, and the X-radiation from the tube was filtered through 0.5 mm Cu and 1 mm Al filters before reaching the sample. The luminescent response was measured using an IP-28 ™ photomultiplier tube at 500 V bias. The voltage from the photomultiplier was measured with a Keithley ™ high impedance electrometer and is proportional to the total light output of the sample.

The major luminescence peak of the phosphor samples was centered at about 280 nm. This value was obtained by taking the prompt emission spectrum of the powder using the unfiltered X-ray source described above. The tube was operated at 70 kVp and 30 mA. The spectrum was acquired with an Instruments S.A. Model HR 320 ™ grating spectrograph equipped with a Princeton Applied Research Model 1422/01 ™ intensified linear diode array detector. The data acquisition and processing was controlled by a Princeton Applied Research Model 1460 OMA III ™ optical multichannel analyzer. The spectrum was corrected for the spectral response of the detector-spectograph combination.

The relative luminescence intensity of the phosphor powder samples as a function of their zirconium content is set out in Table II.

TABLE II

| EXAMPLE NO. | $Hf_{1-z}Zr_z$ Zr CONTENT (z) | RELATIVE INTENSITY |
|---|---|---|
| 1 (Control) | 0.000276 | 100 |
| 2 | 0.00040 | 231 |
| 3 | 0.0010 | 238 |
| 4A | 0.01 | 710 |
| 4B | 0.01 | 743 |
| 5 | 0.019 | 365 |
| 6 | 0.10 | 350 |
| 7 | 0.20 | 155 |
| 8 | 0.30 | 224 |
| 9 (Control) | 0.50 | 80 |

The data of Table II demonstrate that there is an enhancement in hafnia phosphor performance when the zirconium level increased over that found in optical grade hafnium sources (represented by the Control 1). Ranges of z of from $4 \times 10^{-4}$ (0.0004) to 0.3 are demonstrated to exhibit higher luminescence intensities than optical grade hafnia. Best results are demonstrated when z is in the range of from $1 \times 10^{-3}$ (0.001) to 0.2, optimally in the range of from $5 \times 10^{-3}$ (0.005) to 0.1.

EXAMPLES 10–14

Preparation of Phosphors in the Presence of an Alkali Metal Ion ($Hf_{1-z}Zr_zM_m$)

The purpose of presenting these investigations is to demonstrate that the performance of hafnia host phosphors with an elevated zirconium level shown to be effective in Examples 1–9 can be further dramatically improved by preparing the hafnia phosphor in the presence of an alkali metal ion.

In each example a sample consisting of 14.72 grams of trilactatohafnic acid (prepared as described in Examples 1–9 from RGS hafnium oxychloride, z=0.019) was throughly ground with an agate mortar and pestle with $K_2CO_3$ or $Li_2CO_3$ (Alfa Products; Ultra Pure grade). The mole percent of the alkali carbonate flux, based on hafnium, was chosen as indicated below in Table III. The mixtures prepared were heated as described above in Examples 1–9, except for the addition of a washing step after firing to 1000° C. This step involved washing the charge with 150 mL of distilled water for 1 hour. The solid was collected and dried for 5 minute intervals at 20, 35 and 50% power in a 500W CEM model MDS-81 ™ microwave oven. The procedure described above in Examples 1–9 was then completed.

X-ray diffraction analysis of the samples confirmed the presence of monoclinic hafnia. The presence of alkali metal ion in the phosphor powder samples prepared in the presence of alkali carbonate flux was confirmed by atomic absorption analysis.

TABLE III

| | $Hf_{1-z}Zr_zM_m$ | | |
|---|---|---|---|
| Example | M | m | Intensity (Ex. 1 = 100) |
| 5 | — | — | 365 |
| 10 | K | 0.2 | 520 |
| 11 | K | 0.5 | 510 |
| 12 | K | 2.0 | 545 |
| 13 | K | 4.0 | 1005 |
| 14 | Li | 0.14 | 1005 |

A 140 to 275 percent increase in luminescence intensity relative to Example 5 is seen in the above examples containing alkali metal ion.

Referring back to Example 1, it is apparent that the hafnia phosphor samples containing both zirconium in higher levels than found in optical grade hafnium sources and alkali metal ion exhibit luminescence intensities ranging from >5 to >10 times those demonstrated by the hafnia phosphor prepared from an optical grade hafnium source.

EXAMPLES 15–18

Titanium Activated Phosphors ($Hf_{1-z}Zr_zTi_x$)

The purpose of presenting these investigations is to demonstrate the utility of titanium as an activator for the hafnia phosphors of this invention containing higher than optical grade concentrations of zirconia. The titanium also shifts the maximum spectral emission band of the phosphor to visible wavelengths in the blue portion of the spectrum.

In each example a sample consisting of 14.72 grams of trilactotohafnic acid (prepared as described above in Examples 1–9, z=0.019) was throughly ground with varying portions of ammonium bis(oxalato)-oxotitanium (IV), $(NH_4)_2TiO(C_2O_4)_2 2H_2O$, from Johnson Matthey (99.998%). The mole percent titanium, based on hafnium, is indicated below in Table IV. The mixtures were heated and further examined as in Examples 1–9.

X-ray diffraction analyses of Examples 17 and 18 each showed traces of unreacted $TiO_2$. A small amount of hafnium titanate was detected as an impurity phase in Example 18.

The relative luminescence outputs of Examples 5 and 15–18 are set out in Table IV. Not only were the luminescence outputs greatly increased in Examples 15–18, but the luminescence band maximum shifted to 475 nm, thereby providing increased emissions of visible spectrum wavelengths more advantageous for intensifying screen applications.

TABLE IV

| | $Hf_{1-z}Zr_zTi_x$ | |
|---|---|---|
| Example | x | Intensity (Ex. 1 = 100) |
| 5 | — | 365 |
| 15 | 0.02 | 5330 |
| 16 | 0.05 | 4000 |
| 17 | 0.10 | 2730 |
| 18 | 0.25 | 1680 |

From Table IV it is apparent that the inclusion of titanium in the hafnia phosphor samples containing higher than optical grade zirconium concentrations resulted in large increases in luminescence intensities.

Thus, the titanium acted as an activator for the phosphor samples.

EXAMPLES 19-33

Preparation of Titanium Activated Phosphors in the Presence of Lithium Carbonate ($Hf_{1-z}Zr_zTi_xLi_m$)

The purpose of presenting these investigations is to demonstrate that the performance of hafnia host phosphors with an elevated zirconium level (z=0.19) and containing titanium as an activator can be further improved by preparing the hafnia phosphor in the presence of an alkali metal ion.

A sample consisting of 12.26 g of trilactatohafnic acid (prepared as in Examples 1-9) was thoroughly ground with 0.1 g (5 mole percent, x=0.05) of $TiO_2$ (EM Chemicals; Optipur grade) and a selected amount of $Li_2CO_3$ (Alfa Products; Ultrapure grade). The mixtures were processed and tested similarly as in Examples 10-14. In Examples 21-23 the size of the trilactoacetohafnic acid sample was 13.00 grams with the titania increased to 0.106 g to maintain the titanium at 5 mole percent (x=0.05).

The relative intensity of the titanium activated phosphor samples as a function of the alkali metal flux employed is given in Table V.

TABLE V

| | $Hf_{1-z}Zr_zTi_xM_m$ | |
|---|---|---|
| Example | m | Intensity (Ex. 1 = 100) |
| 19 | 0 | 2520 |
| 20 | 0.01 | 2210 |
| 21 | 0.02 | 1000 |
| 22 | 0.06 | 3380 |
| 23 | 0.10 | 6370 |
| 24 | 0.10 | 5960 |
| 25 | 0.20 | 13500 |
| 26 | 0.20 | 14000 |
| 27 | 0.40 | 13700 |
| 28 | 0.50 | 13300 |
| 29 | 0.50 | 13500 |
| 30 | 1.0 | 8695 |
| 31 | 1.5 | 5610 |
| 32 | 2.0 | 3155 |
| 33 | 4.0 | 735 |

Samples in which more than 10 mole percent (m=0.20) $Li_2CO_3$ was added revealed the presence of lithium hafnate in the X-ray powder patterns. The amount of lithium hafnate formed in the samples increased with the $Li_2CO_3$ amount. At 200 mole percent (m=4.0) $Li_2CO_3$ added, lithium hafnate is the primary phase.

From Table V it can be appreciated that values of m of from about $4 \times 10^{-2}$ (0.04) to 2.0 gave significantly improved results, with values of m of from about $1 \times 10^{-1}$ (0.10) to 1.5 providing the highest luminescence intensities observed in these comparisons.

In these comparisons it should be noted that Example 19 did not provide luminescence intensity as high as that reported in Table IV for Example 16, even though both contained 5 mole percent titanium (x=0.05) and neither was prepared in the presence of an alkali metal flux. This difference is attributed to the less efficient incorporation of the titanium activator in Example 19 resulting from employing titania rather than a titanium carboxylate salt as a starting material.

EXAMPLES 34-43

Preparation of Titanium Activated Phosphors in the Presence of Lithium Sulfate ($Hf_{1-z}Zr_zTi_xLi_m$)

The purpose of presenting these investigations is to demonstrate that the proportions of lithium hafnate formed as a second phase can be controlled and reduced by substituting another lithium salt for lithium carbonate.

The same procedures were employed as in Examples 19-33, except that for $Li_2CO_3$ there was substituted $Li_2SO_4$ (Aldrich anhydrous: 99.99%).

The relative intensity of the titanium activated phosphor samples as a function of the lithium sulfate flux employed is given in Table VI. In Table VI the performance data from Table V is also represented for samples prepared using lithium carbonate at the concentration levels as the lithium sulfate.

TABLE VI

| | $Hf_{1-z}Zr_zTi_xM_m$ | | | |
|---|---|---|---|---|
| | $Li_2CO_3$ | | $Li_2SO_4$ | |
| Example | m | Intensity | Example | m | Intensity |
| 20 | 0.01 | 2210 | 34 | 0.01 | 1545 |
| 21 | 0.02 | 1000 | 35 | 0.02 | 1545 |
| 22 | 0.06 | 3380 | 36 | 0.04 | 2105 |
| 23 | 0.10 | 6370 | 37 | 0.06 | 3605 |
| 24 | 0.10 | 5960 | 38 | 0.10 | 7645 |
| 25 | 0.20 | 13500 | 39 | 0.20 | 9115 |
| 26 | 0.20 | 14000 | 40 | 0.50 | 12400 |
| 28 | 0.50 | 13300 | 41 | 1.0 | 9820 |
| 30 | 1.0 | 8695 | 42 | 2.0 | 9330 |
| 32 | 2.0 | 3155 | 43 | 4.0 | 9185 |
| 33 | 4.0 | 735 | | | |

The most important advantage of employing lithium sulfate as a flux as compared to lithium carbonate is that a reduced amount of the lithium hafnate phase is produced. This results in significant improvements in phosphor luminescence when higher proportions of the lithium flux are employed during phosphor formation. At lower, preferred flux concentrations the lithium carbonate flux yields higher luminescence.

EXAMPLES 44-47

Preparation of Phosphors in the Presence of Varied Alkali Metal Ions

The purpose of presenting these investigations is to demonstrate that all of the alkali metals significantly enhance phosphor luminescence.

Example 25 was repeated, except that 10 mole percent (m=0.2) of another alkali metal carbonate was substituted for lithium carbonate: $Na_2CO_3$ (0.265 g; EM Chemicals Suprapur Reagent), $K_2CO_3$ (0.346 g; Alfa Products Ultrapure grade), $Rb_2CO_3$ (0.5774 g; AESAR 99.9%), or $Cs_2CO_3$ (0.8146 g; AESAR 99.9%).

The luminescence intensities measured for the resulting samples are set out in Table VII.

TABLE VII

| Example | Carbonate source | Intensity (Ex. 1 = 100) |
|---|---|---|
| 19 | None | 2520 |
| 25 | $Li_2CO_3$ | 13500 |
| 44 | $Na_2CO_3$ | 10400 |
| 45 | $K_2CO_3$ | 5400 |
| 46 | $Rb_2CO_3$ | 3645 |
| 47 | $Cs_2CO_3$ | 4840 |

From Table VII it is apparent that all of the alkali metals are effective to increase the luminescence of the hafnia phosphors prepared from sources having higher zirconium contents than found in optical grade sources of hafnium. From Table VII it is observed that the lower the atomic number alkali metals lithium, sodium, and potassium offer a significant performance advantage over the heavier alkali metals rubidium and cesium when equal starting concentrations are employed.

EXAMPLES 48-51

Preparation of Phosphors Using Varied Alkali Metal Compounds

The purpose of presenting these investigations is to demonstrate the utility of alkali metal compounds completed by moieties other than sulfate and carbonate.

Example 25 was repeated, except that one of the following lithium sources was substituted for lithium carbonate: 0.2548 g $Li_2C_2O_4$ (10 mole percent, m=0.2, Alfa Products reagent grade), 0.212 g LiCl (20 mole percent, m=0.2, Alfa Products anhydrous Ultrapure grade), 0.4343 g LiBr (20 mole percent, m=0.2, MCB anhydrous) or 0.21 g $LiOH-H_2O$ (20 mole percent, m=0.2, MCB reagent).

The luminescence intensities are given in Table VIII.

TABLE VIII

| Example | Lithium Cmpd. | Intensity (Ex. 1 = 100) |
|---|---|---|
| 19 | None | 2520 |
| 48 | $Li_2C_2O_4$ | 12695 |
| 49 | LiCl | 6730 |
| 50 | LiBr | 9400 |
| 51 | $LiOH:H_2O$ | 13185 |

From Table VIII it is apparent that all of the lithium compounds improve the luminescence of the phosphor. While both lithium hydroxide and lithium oxalate produced significantly higher levels of luminescence than the lithium halides, alkali carboxylates are clearly more convenient to handle than alkali hydroxides.

EXAMPLES 52-54

Enhancement of Phosphor Luminescence by a Combination of Titanium and Alkali Metal Ion The purpose of presenting these investigations is to demonstrate the synergistic improvement of luminescence produced by the combination of an alkali metal ion and the titanium activator.

EXAMPLE 52

A sample consisting of 13.475 g of trilactatohafnic acid (prepared as described in Examples 1-9) was thoroughly ground in an agate mortar and pestle with 0.2032 g $Li_2CO_3$ (10 mole percent, m=0.2, Alfa Products Ultrapure grade) and processed as in Examples 10-14.

EXAMPLE 53

Example 15 was repeated, except that 13.475 g of trilactatohafnic acid was used with 0.44 g of $TiO_2$ (2 mole percent, x=0.02, EM chemicals Optipur grade).

EXAMPLE 54

Example 53 was repeated, except for the addition of 0.2032 g $Li_2CO_3$ (10 mole percent, m=0.2, Alfa Products Ultrapure grade) in the starting mixture.

The luminescence performances of Examples 5 and 52-54 are compared in Table IX.

TABLE IX

| Example | Additions | Intensity (Ex. 1 = 100) |
|---|---|---|
| 5 | none | 365 |
| 52 | 10 mole % $Li_2CO_3$ | 1120 |
| 53 | 2 mole % $TiO_2$ | 5690 |
| 54 | 10 mole % $Li_2CO_3$ + 2 mole % $TiO_2$ | 14600 |

From Table IX it is apparent that a disproportionately large increase in luminescence was realized by employing both the titanium activator and the alkali metal ion. While each of the titanium and alkali metal alone enhanced luminescence, a larger increase in luminescence was attained when titanium and alkali metal ion were employed together than could have been predicted assuming the separate enhancements of luminescence to be fully additive.

EXAMPLES 55-62

Phosphors Containing 5 Mole Percent or Less Titanium

The purpose of presenting these investigations is to demonstrate the enhancements in luminescence produced by the use as starting materials of titanium at concentrations of 5 mole percent (x=0.05) and less, thereby presenting a better performance definition of the lower ranges of titanium concentrations.

Potassium tetraoxalatohafnate (IV) 5-hydrate was prepared as described in Inorg. Syn., VIII, 42 (1966) using R.S.G. hafnium oxychloride 8-hydrate (z=0.019). Upon drying at 70°-90° C. for 1-16 hours in a convection oven, the product analyzed at closer to a 3-hydrate composition and all subsequent use of this material was calculated as the 3-hydrate. Fifteen grams of the material was thoroughly ground in a agate mortar and pestle with 0.03-5 mole percent of potassium bis(oxalato)-oxotitane (IV) 2-hydrate (Alfa Products, recrystallized from ethanol). The mixtures were placed in 20 mL alumina crucibles, covered with alumina lids, and then placed in 100 mL alumina crucibles, which were covered with alumina lids. The samples were heated in air to 1000° C. for 2.5 hours, then cooled to room temperature. The resulting solids were removed from the crucibles, broken into small pieces with an alumina mortar and pestle and washed by stirring in 50 mL of distilled water. The solids were then collected and dried in a convection oven at 80° C. The charges were placed in 10 mL alumina crucibles with alumina lids and heated in air to 1300° C. for 2 hours, followed by cooling to room temperature.

The luminescence intensities of the samples are set out in Table X.

TABLE X

| Example | Mole percent Ti | Intensity (Ex. 1 = 100) |
|---|---|---|
| 5 | None | 365 |
| 55 | 0.03 | 5750 |
| 56 | 0.3 | 6128 |
| 57 | 1 | 9470 |
| 58 | 2 | 10500 |
| 59 | 3 | 8420 |
| 60 | 3 | 9820 |
| 61 | 4 | 8060 |
| 62 | 5 | 9120 |

From Table X it is apparent that even at the lowest concentrations of titanium ($Hf_{1-z}Zr_zTi_x$ where $x=3\times10^{-4}$, Example 55) much higher levels of luminescence are observed than in Example 5, which lacked titanium. While some of the enhancement in luminescence as compared to Example 5 can be attributed to the presence of potassium, comparing luminescence values from Table III, in which potassium was introduced without titanium being present, it is apparent that a part of the luminescence enhancement must be attributed to additional presence of the titanium.

EXAMPLES 63-68

Varied Levels of Zirconium in Phosphors Prepared in the Presence of Alkali Metal Ion The purpose of presenting these investigations is to demonstrate the effect of varied levels of zirconium in the hafnia host phosphor when the hafnia phosphor was prepared in the presence of alkali metal ion.

Two grades of potassium tetraoxalatohafnate (IV) 3-hydrate were prepared as in Example 55 from optical grade hafnium oxychloride 8-hydrate and R.G.S. hafnium oxychloride 8-hydrate. Potassium tetraoxalatozirconate 3-hydrate was prepared as in Example 53 from R.G.S. zirconium oxychloride 8-hydrate. A series of $Hf_{1-z}Zr_zO_2$ samples in which z was varied from $2.76\times10^{-4}$ to $6.84\times10^{-2}$ were prepared from mixtures of the above precursors. The powders were combined and ground in an agate mortar and pestle. The procedures of Examples 55-62 were employed, with the addition of 10 mole percent $K_2CO_3$ (Alfa Products Ultrapure grade) to each sample.

Luminescence intensities as a function of zirconium levels (z) are given in Table XI.

TABLE XI

| Example | z | Intensity (Ex. 1 = 100) |
|---|---|---|
| 63 (Control) | $2.8 \times 10^{-4}$ | 380 |
| 64 | $4.3 \times 10^{-4}$ | 165 |
| 65 | $9.6 \times 10^{-3}$ | 770 |
| 66 | $1.9 \times 10^{-2}$ | 520 |
| 67 | $4.0 \times 10^{-2}$ | 595 |
| 68 | $6.0 \times 10^{-2}$ | 610 |

Note that Example 66 was identical to Example 10, except for employing a different final firing temperature, and the luminescence measured was identical.

Table XI demonstrates that hafnia prepared from optical grade sources as in Control Example 63 yields inferior luminescence as compared to samples in which the zirconium content z is equal to at least $1\times10^{-2}$. Comparing Tables II and XI, it is apparent that the presence of potassium ion is responsibile for a significant increase in luminescence at zirconium levels equal to that in R.G.S. hafnia (z=0.019) and above.

EXAMPLES 69-72

Determinations of Alkali Metal Ion Incorporation in Phosphors Differing in Zirconium Levels The purpose of presenting these investigations is to provide quantitative determinations of alkali ion incorporation levels (y) in several phosphors satisfying the general relationship $Hf_{1-z}Zr_zTi_xM_y$ and having differing zirconium levels (z) satisfying the requirements of the invention.

Samples were prepared as in Examples 63-68, except for the further addition of 0.2151 g of recrystallized potassium bis(oxalato)oxotitanate (IV) 2-hydrate (Alfa Products) to satisfy the ratio x=0.03.

Proportions of zirconium, titanium, and potassium ion in the completed phosphor samples were determined by atomic absorption analysis and inductively coupled plasma spectrometry. The luminescence of the phosphors together with their alkali ion content observed on analysis, y(obs), are reported in Table XII. The amounts of zirconium and titanium present in the starting materials, z(calc) and x(calc), are compared in Table XII to the amounts of zirconium and titanium found on analysis, z(obs) and x(obs).

TABLE XII $Hf_{1-z}Zr_zTi_xM_y$

| Ex | Intensity (Ex. 1 = 100) | z(calc) | z(obs) | x (calc) | x(obs) | y (obs) |
|---|---|---|---|---|---|---|
| 69 | 9820 | $4.3 \times 10^{-4}$ | $4.31 \times 10^{-4}$ | 0.03 | 0.022 | 0.022 |
| 70 | 9820 | $9.6 \times 10^{-4}$ | $8.79 \times 10^{-4}$ | 0.03 | 0.026 | 0.019 |
| 71 | 9820 | $1.9 \times 10^{-2}$ | $1.78 \times 10^{-2}$ | 0.03 | 0.031 | 0.025 |
| 72 | 9820 | $4.0 \times 10^{-2}$ | $3.87 \times 10^{-2}$ | 0.03 | 0.027 | 0.023 |

Although all samples exhibited similar luminescence, when a corresponding phosphor was formed from optical grade hafnium starting materials $[z(obs)=2.91\times10^{-4}]$, a significantly lower luminescence was observed.

EXAMPLE 73-77

Rare Earth Activated Phosphors

The purpose of presenting these investigations is to demonstrate enhanced performance of rare earth activated zirconium rich hafnia phosphors—$Hf_{1-z}Zr_zL_w$, where A represents a rare earth, z=0.019.

EXAMPLE 73

A sample consisting of 15.00 g of potassium tetraoxalatohafnate (IV) 3-hydrate prepared as in Example 53 was combined and ground thoroughly with 0.0861 g (x=0.03) of $Eu(NO_3)_3.6H_2O$ (Johnson Matthey REaction grade, 99.99%). The mixture was fired in a double alumina crucible steup (described in Example 1) to 1000° C. in air for 2 hours. The recovered ingot was broken into small chunks and washed in 70-150 mL of distilled water. The relative luminescence intensity was 770.

When Example 73 was repeated with increased levels of zirconium, small shifts in emission maxima were observed, indicating that zirconium content can be usefully varied in preparing these phosphors for use in intensifying screens. In intensifying screens intended to be employed with spectrally sensitized silver halide radiographic elements optimum imaging efficiency occurs when the emission peak of the phosphor corresponds with the absorption peak of the spectral sensitizing dye or dye combination present in the radiographic element.

EXAMPLE 74

A sample consisting of 14.82 g of potassium tetraoxalatohafnate (IV) 3-hydrate prepared from R.G.S. hafnium oxychloride 8-hydrate was ground with 0.0042 g (x=0.001) $SmF_3$ (Johnson Matthey REaction grade) and processed as in Example 73. The relative luminescence intensity was 735.

EXAMPLE 75

Example 74 was repeated, however, 0.083 g (x=0.02) of SmF$_3$ was used. The relative luminescence output was 400.

EXAMPLE 76

A sample consisting of 15.00 g of potassium tetraoxalotohafnate (IV) 3-hydrate prepared from R.G.S. hafnium oxychloride 8-hydrate was ground with 0.11 g (x=0.015) of Gd$_2$O$_3$ (Rhone Poulenc 99.99%). The mixtures were fired as in Example 73, and then reheated in air at 1300° C. for 2.5 hours. The relative luminescence output was 430.

EXAMPLE 77

Example 76 was repeated, except that 0.22 g (x=0.03) of Gd$_2$O$_3$ was used. The relative luminescence output was 490.

EXAMPLE 78

Intensifying Screen

The purpose of presenting these investigations is to demonstrate enhanced performance of intensifying screens containing zirconium rich hafnia phosphors.

Hafnyl oxalic acid 3-hydrate was prepared for use as a starting material in the manner described in *Zhurnal Neoorganicheskoi Khimi*, Vol. II, p. 980 (1957) using R.G.S. hafnium oxychloride, z=0.019. Two samples each consisting of 55.29 g of hafnyl oxalic acid 3-hydrate were thoroughly ground with 1.11 g of Li$_2$CO$_3$ (Aldrich; reagent grade), 4.36 g of K$_2$SO$_4$ (J. T. Baker; reagent grade) and 0.50 g of TiO$_2$ (EM Chemicals; Optipur grade).

The samples were placed in 250 mL alumina crucibles, covered with alumina lids, and heated in air to 1000° C. for 2.5 hours, then cooled to room temperature. The resulting solids were removed from the crucibles, broken into small pieces with a mortar and pestle, and washed by stirring in 500 mL of distilled water. Each sample was then collected and dried in a convection oven at 80° C. The charges were placed in 50 mL alumina crucibles with alumina lids and heated in air to 1400° C. for 1.5 hours, followed by cooling to room temperature. The two samples (combined weight, 53.1 g) were ground together and shaken through a nylon sieve with 60 μm openings to give 28.6 g of product phosphor.

The phosphor was mixed with 13% Permuthane ™ polyurethane solution in a methylene chloride and methanol mixture to produce a dispersion with 25 parts of phosphor and 1 part of binder by weight. The dispersion was coated on a blue tinted transparent poly(ethylene terephthalate) film support to produce a coating with about 6.25 g/dm$^2$ of the phosphor. This coating when excited with unfiltered X-rays from a tungsten target tube operated at 70 kVp and 10 mA gives a speed that is about 3.5 times larger than that obtained from a commercial CaWO$_4$ (PAR screen) when the emission is compared using an IP-28 ™ photomultiplier tube.

The invention has been described in detail with particular reference to preferred embodiments thereof, but it will be understood that variations and modifications can be effected within the spirit and scope of the invention.

What is claimed is:

1. An intensifying screen comprised of
   a support and
   a fluorescent layer containing a phosphor capable of absorbing X-radiation and emitting longer wavelength electromagnetic radiation comprised of monoclinic crystals of a titanium activated zirconium hafnium oxide phosphor host,
   characterized in that the monoclinic crystals consist essentially of oxygen and combined elements satisfying the relationship:

$$Hf_{1-z}Zr_zM_yTi_xE_e$$

where
   E represents at least one of germanium and silicon;
   e is in the range of from greater than $1 \times 10^{-3}$ to 0.1;
   M represents at least one alkali metal;
   x is in the range of from $3 \times 10^{-4}$ to 1.0;
   y is in the range of from $1 \times 10^{-4}$ to 1.0; and
   z is in the range of from $4 \times 10^{-4}$ to 0.3.

2. An intensifying screen according to claim 1 further characterized in that
   y is in the range of from $6 \times 10^{-4}$ to 1.0.

3. An intensifying screen comprised of
   a support and
   a fluorescent layer containing a phosphor capable of absorbing X-radiation and emitting longer wavelength electromagnetic radiation comprised of monoclinic crystals of a titanium activated zirconium hafnium oxide host,
   characterized in that the monoclinic crystals consist essentially of oxygen and combined elements satisfying the relationship:

$$Hf_{1-z}Zr_zM_yTi_xG_vE_e$$

where
   E represents at least one of germanium and silicon;
   e is in the range of from greater than $1 \times 10^{-3}$ to 0.1;
   G represents a metal selected from the class consisting of scandium and indium;
   M represents at least one alkali metal;
   v is in the range of from $1 \times 10^{-6}$ to $1 \times 10^{-2}$;
   x is in the range of from $3 \times 10^{-4}$ to 1.0;
   y is in the range of from $1 \times 10^{-4}$ to 1.0; and
   z is in the range of from $4 \times 10^{-4}$ to 0.3.

4. An intensifying screen according to claim 3 further characterized in that E is germanium.

5. An intensifying screen according to claim 3 further characterized in that E is silicon.

6. An intensifying screen according to claim 3 further characterized in that y is in the range of from $6 \times 10^{-4}$ to 1.0.

7. An intensifying screen comprised of
   a support and
   a fluorescent layer containing a phosphor capable of absorbing X-radiation and emitting longer wavelength electromagnetic radiation comprised of monoclinic crystals of a titanium activated zirconium hafnium oxide host,
   characterized in that the monoclinic crystals consist essentially of oxygen and elements that satisfy the relationship $$Hf_{1-z}Zr_zM_yTi_xL_wG_vE_e$$

wherein
   E represents at least one of germanium and silicon;
   e is in the range of from greater than $1 \times 10^{-3}$ to 0.1;

G represents at least one indium and scandium;
v is in the range of from 0 to $1 \times 10^{-2}$;
L represents a rare earth selected from among those have an atomic number of 39, 60, 62 to 64 inclusive, and 67 to 71 inclusive;
w is in the range of from 0 to $1 \times 10^{-2}$;
M represents at least one alkali metal;
y is in the range of from $1 \times 10^{-4}$ to 0.3;
x is in the range of from $3 \times 10^{-4}$ to 1.0; and
z is in the range of from $4 \times 10^{-4}$ to 0.3.

8. An intensifying screen according to claim 7 further characterized in that e is in the range of from at least $2 \times 10^{-3}$ to 0.1.

9. An intensifying screen according to claim 8 further characterized in that E is germanium.

10. An intensifying screen according to claim 8 further characterized in that E is silicon.

11. An intensifying screen according to claim 7 further characterized in that v is in the range of from $1 \times 10^{-6}$ to $5 \times 10^{-3}$.

12. An intensifying screen according to claim 7 further characterized in that y is in the range of from $6 \times 10^{-4}$ to 1.0.

13. An intensifying screen comprised of
a support and
a fluorescent layer containing a phosphor capable of absorbing X-radiation and emitting longer wavelength electromagnetic radiation comprised of monoclinic crystals of a titanium activated zirconium hafnium phosphor oxide host,
characterized in that the monoclinic crystals consist essentially of oxygen and elements that satisfy the relationship $$Hf_{1-z}Zr_zM_yTi_xNd_wIn_vE_e$$

wherein
E represents at least one of germanium and silicon;
e is in the range of from greater than $1 \times 10^{-3}$ to 0.1;
v is in the range of from 0 to $5 \times 10^{-3}$;
w' is in the range of from 0 to $5 \times 10^{-4}$;
M represents at least one alkali metal;
y is in the range of from $6 \times 10^{-4}$ to 0.3;
x is in the range of from $3 \times 10^{-4}$ to 1.0; and
z is in the range of from $4 \times 10^{-4}$ to 0.3.

14. An intensifying screen according to claim 13 further characterized in that z is in the range of from $1 \times 10^{-3}$ to 0.2.

15. An intensifying screen according to claim 14 further characterized in that z is in the range of from $2 \times 10^{-3}$ to 0.1.

16. An intensifying screen according to claim 13 further characterized in that M is at least one of sodium and potassium and y is in the range of from $8 \times 10^{-4}$ to 0.07.

17. An intensifying screen according to claim 13 further characterized in that $M_y$ is a mixture of alkali metals satisfying the relationship $$(M^1)_{y1}(M^2)_{y2}$$

where
$M^1$ is an alkali metal chosen from the group consisting of lithium, sodium and potassium;
$M^2$ is at least one alkali metal other than that represented by $M^1$;
$y^1 + y^2 = y$; and
$y^1$ and $y^2$ are each at least $1 \times 10^{-6}$.

18. An intensifying screen according to claim 17 further characterized in that $y^1$ and $y^2$ are each at least $1 \times 10^{-5}$.

19. An intensifying screen according to claim 17 further characterized in that $M^1$ is lithium.

20. An intensifying screen according to claim 19 further characterized in that $(M^2)_{y2}$ satisfies the relationship:

$$M'_{y'}M''_{y''}$$

where
M' is at least one of sodium and potassium;
y' is at least $1 \times 10^{-6}$;
M'' is at least one of cesium and rubidium; and
y'' is in the range of from $1 \times 10^{-5}$ to 0.1.

21. An intensifying screen according to claim 20 further characterized in that y'' is in the range of from $5 \times 10^{-5}$ to $5 \times 10^{-3}$.

22. An intensifying screen according to claim 13 further characterized in that x is in the range of from $3 \times 10^{-4}$ to 0.5.

23. An intensifying screen according to claim 13 further characterized in that w' is in the range of $5 \times 10^{-8}$ to $2 \times 10^{-4}$.

24. An intensifying screen according to claim 23 further characterized in that w' is in the range of from $2 \times 10^{-6}$ to $1 \times 10^{-5}$.

25. An intensifying screen according to claim 23 further characterized in that v is in the range of from $2 \times 10^{-6}$ to $1 \times 10^{-3}$.

26. An intensifying screen according to claim 13 further characterized in that v is in the range of from $1 \times 10^{-6}$ to $5 \times 10^{-3}$.

27. An intensifying screen according to claim 13 further characterized in that e is in the range of from $2 \times 10^{-3}$ to 0.1.

28. An intensifying screen according to claim 27 further characterized in that e is in the range of from $5 \times 10^{-3}$ to $8 \times 10^{-2}$.

29. An intensifying screen according to any one of claims 12 to 27 inclusive further characterized in that E is germanium.

30. An intensifying screen according to any one of claims 13 to 28 inclusive further characterized in that E is silicon.

* * * * *